United States Patent
Nguyen et al.

(10) Patent No.: US 10,517,050 B2
(45) Date of Patent: Dec. 24, 2019

(54) COMPLIANCE WITH REGIONAL REGULATORY REQUIREMENTS FOR USER EQUIPMENT WITH POSITIVE ANTENNA GAIN

(71) Applicant: QUALCOMM Incorporated, San Diego, CA (US)

(72) Inventors: Tien Viet Nguyen, Bedminster, NJ (US); Shailesh Patil, San Diego, CA (US); Kapil Gulati, Dover, DE (US); Sudhir Kumar Baghel, Hillsborough, NJ (US); Gene Fong, San Diego, CA (US); John Forrester, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/132,707

(22) Filed: Sep. 17, 2018

(65) Prior Publication Data

US 2019/0104485 A1 Apr. 4, 2019

Related U.S. Application Data

(60) Provisional application No. 62/566,904, filed on Oct. 2, 2017.

(51) Int. Cl.
*H04W 24/00* (2009.01)
*H04W 52/36* (2009.01)
*H04W 72/04* (2009.01)

(52) U.S. Cl.
CPC ...... *H04W 52/367* (2013.01); *H04W 72/0473* (2013.01)

(58) Field of Classification Search
CPC . H04W 52/08; H04W 52/146; H04W 52/245; H04W 52/36; H04W 52/367;

(Continued)

(56) References Cited

U.S. PATENT DOCUMENTS 9,491,708 B2 * 11/2016 Jung .................... H04W 52/146
2010/0056163 A1 * 3/2010 Schmidt ................ H04W 16/18
455/446

(Continued)

OTHER PUBLICATIONS

Ericsson: "Extension of the Network-Signaling (NS) Value Range", 3GPP Draft; R4-1708323, 3rd Generation Partnership Project (3GPP), Mobile Competence Centre; 650, Route Des Lucioles; F-06921 Sophia-Antipolis Cedex ; France, vol. RAN WG4, no. Berlin, Germany; 20170821-20170825, Aug. 20, 2017 (Aug. 20, 2017), XP051321458, 8 pages, Retrieved from the Internet:URL: http://www.3gpp.org/ftp/Meetings_3GPP_SYNC/RAN4/Docs/[retrieved on Aug. 20, 2017].

(Continued)

*Primary Examiner* — Quan M Hua
(74) *Attorney, Agent, or Firm* — Holland & Hart LLP

(57) ABSTRACT

Additional requirements for spectrum emissions may be matched with regional requirements, and an additional maximum power reduction (A-MPR) for a user equipment (UE) may be based on an actual antenna gain of the UE. For example, a UE may be located in a particular region and be required to meet regional requirements for wireless communications. In such cases, the UE may receive network signaling from a base station, and identify an antenna gain for its antenna. The UE may then identify a set of emission requirements based on the identified antenna gain and the network signaling. Additionally, the UE may identify an A-MPR based on the set of emission requirements and the antenna gain and may adjust a maximum output power in accordance with the identified A-MPR. In some examples, an output power threshold may be derived using a difference between a regional requirement and the UE's antenna gain.

30 Claims, 16 Drawing Sheets

(58) Field of Classification Search
CPC .. H04W 72/0473; H04W 72/048; H04B 1/40; H04B 7/0413; H04B 7/18515; H04B 7/18563; H04L 1/1607; H04L 5/14; H04L 5/16

See application file for complete search history.

(56) References Cited

U.S. PATENT DOCUMENTS

| | | | | |
|---|---|---|---|---|
| 2010/0309828 A1* | 12/2010 | Nguyen | ............. | H04B 7/18539 370/281 |
| 2013/0053103 A1* | 2/2013 | Kim | ........................ | H04L 5/003 455/561 |
| 2015/0350850 A1* | 12/2015 | Edge | ........................ | H04W 4/04 455/456.1 |

OTHER PUBLICATIONS

LG Electronics: "A-MPR Simulation Assumptions based on European Regulation for LTE-based V2X UE", 3GPP Draft; R4-168241_A-MPR Test Parameters based on European Regulation for LTE-based V2X UE, 3rd Generation Partnership Project (3GPP), Mobile Competence Centre; 650, Route Des Lucioles; F-06921 S, vol. RAN WG4, no. Ljubljana, Slovenia; 20161010-20161014, Oct. 9, 2016 (Oct. 9, 2016), XP051153162, 4 pages, Retrieved from the Internet:URL: http://www.3gpp.org/ftp/Meetings_3GPP_SYNC/RAN4/Docs/ [retrieved on Oct. 9, 2016].

NTT Docomo, et al., "Further Consideration on PCMAX in mmWave OTA", 3GPP Draft; R4-1709391_Further Consideration on PCMAX in mmWave OTA, 3rd Generation Partnership Project (3GPP), Mobile Competence Centre; 650, Route Des Lucioles; F-06921 Sophia-Antipolis Cedex; FR, vol. RAN WG4, no. Nagoya, Japan; 20170918-20170921, Sep. 17, 2017 (Sep. 17, 2017), XP051344529, 4 pages, Retrieved from the Internet:URL : http://www.3gpp.org/ftp/Meetings_3GPP_SYNC/RAN4/Docs/[retrieved on Sep. 17, 2017].

International Search Report and Written Opinion—PCT/US2018/051512—ISA/EPO—dated Nov. 22, 2018.

LG Electronics: "Consideration on the High Power Vehicle UE for LTE-based V2X Service", 3GPP Draft; R4-165711_Consideration on High Power Vehicle UE for LTE-based V2X Service_Rev1, 3rd Generation Partnership Project (3GPP), Mobile Competence Centre; 650, Route Des Lucioles ; F-06921 SOP, vol. RAN WG4, no. Gothenburg, Sweden; 20160822-20160826, Aug. 12, 2016 (Aug. 12, 2016), XP051135463, 5 pages, Retrieved from the Internet: URL: http://www.3gpp.org/ftp/tsg_ran/WG4_Radio/TSGR4_80/Docs/ [retrieved on Aug. 12, 2016].

Qualcomm Incorporated: "Discussion on Handling EIRP Requirements for Regional Requirements for V2X", 3GPP Draft; R4-1710164-Discussion on Handling EIRP Requirements for Regional Requirements for V2X, 3rd Generation Partnership Project (3GPP), Mobile Competence Centre ; 650, Route Des Lucioles ; F-06, vol. RAN WG4, no. Dubrovnik, Croatia; 20171009-20171015, Oct. 2, 2017 (2017-1 0-02), XP051358081, 3 pages, Retrieved from the Internet: URL: http://www.3gpp.org/ftp/tsg_ran/WG4_Radio/TSGR4_84Bis/Docs/ [retrieved on Oct. 2, 2017).

"RAN4#80bis Meeting Report", 3GPP Draft; R4-1609011, 3rd Generation Partnership Project (3GPP), Mobile Competence Centre; 650, Route Des Lucioles ; F-06921 Sophia-Antipolis Cedex; France, vol. RAN WG4, no. Reno, Nevada, USA; 20161114-20161118, Nov. 17, 2016 (Nov. 17, 2016), XP051194406, 644 pages, Retrieved from the Internet: URL: http://www.3gpp.org/ftp/tsg_ran/WG4_Radio/TSGR4_80Bis/Report/ [retrieved on Nov. 17, 2016].

* cited by examiner

COMPLIANCE WITH REGIONAL REGULATORY REQUIREMENTS FOR USER EQUIPMENT WITH POSITIVE ANTENNA GAIN

CROSS REFERENCES

The present application for patent claims benefit of U.S. Provisional Patent Application No. 62/566,904 by Nguyen et al., entitled "Compliance With Regional Regulatory Requirements for User Equipment with Positive Antenna Gain," filed Oct. 2, 2017, assigned to the assignee hereof, and expressly incorporated by reference in its entirety.

BACKGROUND

The following relates generally to wireless communication, and more specifically to compliance with regional regulatory requirements for user equipment (UEs) with positive antenna gain.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UEs.

In some wireless communications systems, a UE may comply with certain requirements that regulate spectral emissions by wireless devices. For example, a transmitting UE may adjust a maximum transmission output power to meet regional regulatory requirements (e.g., to prevent interference on certain radio frequency bands in a particular region). However, techniques used for the power adjustment may rely on certain assumptions about the antenna gain of a given UE, and for some UEs (e.g., UEs that support vehicle-to-everything (V2X) communications), there may be disparity between the assumed antenna gain and the actual antenna gain of the UE. As a result, it may be desirable to utilize techniques for output power adjustment that are based on the actual antenna gain of the UE when complying with regional regulatory requirements.

SUMMARY

The described techniques relate to improved methods, systems, devices, or apparatuses that support compliance with regional regulatory requirements for user equipment (UEs) with positive antenna gain. Aspects described herein may enable the efficient deployment of different UEs having different antenna gains throughout various regions, thereby avoiding region-specific modification of the UE's design to comply with regional regulatory requirements. Generally, the described techniques provide for matching additional requirements for spectrum emissions with regional requirements and the use of an additional maximum power reduction (A-MPR) based on an actual antenna gain of a UE. For example, a UE that has a positive antenna gain (e.g., greater than or equal to 0 decibels-isotropic (dBi)) may be located in a particular region or geographic location and be required to meet additional regional requirements for wireless communications. In such cases, the UE may receive network signaling from a nearby cell or base station that indicates the additional requirements to be met. The UE may identify an antenna gain for its antenna and identify a set of emission requirements based on the identified antenna gain and the network signaling. Additionally, the UE may identify an A-MPR based on the set of emission requirements and the antenna gain and adjust a maximum output power in accordance with the identified A-MPR. Through the adjustment of the maximum output power, the UE may satisfy the additional requirements and regional regulatory requirements, where the emissions of the UE (e.g., maximum output power, spectrum emission mask, power spectral density, spurious emissions, receiver spurious emissions, etc.) do not exceed a threshold requirement. In some examples, the threshold may be derived based on a difference between a regional requirement (e.g., an equivalent isotropic radiated power (EIRP)) and the UE's antenna gain. As a result, the UE may meet the regional requirements without the need for additional testing or certification in multiple different regions.

A method of wireless communication is described. The method may include identifying an antenna gain for an antenna of the UE, identifying a set of emission requirements based at least in part on the antenna gain and NS received from a base station, identifying an A-MPR based at least in part on the set of emission requirements and the antenna gain, the A-MPR used to satisfy regional regulatory requirements where the UE is located, and transmitting data using a maximum output power that is adjusted in accordance with the A-MPR.

An apparatus for wireless communication is described. The apparatus may include means for identifying an antenna gain for an antenna of the UE, means for identifying a set of emission requirements based at least in part on the antenna gain and NS received from a base station, means for identifying an A-MPR based at least in part on the set of emission requirements and the antenna gain, the A-MPR used to satisfy regional regulatory requirements where the UE is located, and means for transmitting data using a maximum output power that is adjusted in accordance with the A-MPR.

Another apparatus for wireless communication is described. The apparatus may include a processor, memory in electronic communication with the processor, and instructions stored in the memory. The instructions may be operable to cause the processor to identify an antenna gain for an antenna of the UE, identify a set of emission requirements based at least in part on the antenna gain and NS received from a base station, identify an A-MPR based at least in part on the set of emission requirements and the antenna gain, the A-MPR used to satisfy regional regulatory requirements where the UE is located, and transmit data using a maximum output power that is adjusted in accordance with the A-MPR.

A non-transitory computer-readable medium for wireless communication is described. The non-transitory computer-readable medium may include instructions operable to cause a processor to identify an antenna gain for an antenna of the UE, identify a set of emission requirements based at least in part on the antenna gain and NS received from a base station, identify an A-MPR based at least in part on the set of emission requirements and the antenna gain, the A-MPR used to satisfy regional regulatory requirements where the UE is located, and transmit data using a maximum output power that is adjusted in accordance with the A-MPR.

Some examples of the method, apparatus, and non-transitory computer-readable medium described herein may further include processes, features, means, or instructions for transmitting an indication of the antenna gain to the base station.

Some examples of the method, apparatus, and non-transitory computer-readable medium described herein may further include processes, features, means, or instructions for receiving, from the base station, the NS including an NS value associated with an antenna gain group that includes the antenna gain. Some examples of the method, apparatus, and non-transitory computer-readable medium described herein may further include processes, features, means, or instructions for identifying the A-MPR based on the antenna gain and the NS value.

Some examples of the method, apparatus, and non-transitory computer-readable medium described herein may further include processes, features, means, or instructions for receiving, from the base station, the NS including an NS value associated with a plurality of antenna gain groups. Some examples of the method, apparatus, and non-transitory computer-readable medium described herein may further include processes, features, means, or instructions for identifying an antenna gain group of the plurality of antenna gain groups, the antenna gain group including the antenna gain. Some examples of the method, apparatus, and non-transitory computer-readable medium described herein may further include processes, features, means, or instructions for identifying the A-MPR based on the antenna gain group.

Some examples of the method, apparatus, and non-transitory computer-readable medium described herein may further include processes, features, means, or instructions for applying the A-MPR to satisfy a conducted test threshold, the conducted test threshold based on a difference between an EIRP value and the antenna gain, wherein the set of emission requirements comprises EIRP requirements.

In some examples of the method, apparatus, and non-transitory computer-readable medium described herein, the A-MPR may be from a set of A-MPR values, different A-MPR values of the set of A-MPR values corresponding to respective antenna gain groups.

In some examples of the method, apparatus, and non-transitory computer-readable medium described herein, each of the respective antenna gain groups comprise a range of antenna gain values that may be non-overlapping between the respective antenna gain groups.

Some examples of the method, apparatus, and non-transitory computer-readable medium described herein may further include processes, features, means, or instructions for determining a region that the UE may be located in based at least in part on global navigation satellite system (GNSS) positioning signaling. Some examples of the method, apparatus, and non-transitory computer-readable medium described herein may further include processes, features, means, or instructions for identifying the NS based at least in part on the determined region. In some examples of the method, apparatus, and non-transitory computer-readable medium described herein, the antenna gain may be greater than or equal to 0 dBi.

Some examples of the method, apparatus, and non-transitory computer-readable medium described herein may further include processes, features, means, or instructions for transmitting the data using a vehicle-to-everything (V2X) transmission.

A method of wireless communication is described. The method may include identifying a set of emission requirements based at least in part on an antenna gain associated with an antenna of a UE, the set of emission requirements to satisfy regional regulatory requirements where the UE is located and transmitting, to the UE, NS comprising an indication of the set of emission requirements.

An apparatus for wireless communication is described. The apparatus may include means for identifying a set of emission requirements based at least in part on an antenna gain associated with an antenna of a UE, the set of emission requirements to satisfy regional regulatory requirements where the UE is located and means for transmitting, to the UE, NS comprising an indication of the set of emission requirements.

Another apparatus for wireless communication is described. The apparatus may include a processor, memory in electronic communication with the processor, and instructions stored in the memory. The instructions may be operable to cause the processor to identify a set of emission requirements based at least in part on an antenna gain associated with an antenna of a UE, the set of emission requirements to satisfy regional regulatory requirements where the UE is located and transmit, to the UE, NS comprising an indication of the set of emission requirements.

A non-transitory computer-readable medium for wireless communication is described. The non-transitory computer-readable medium may include instructions operable to cause a processor to identify a set of emission requirements based at least in part on an antenna gain associated with an antenna of a UE, the set of emission requirements to satisfy regional regulatory requirements where the UE is located and transmit, to the UE, NS comprising an indication of the set of emission requirements.

Some examples of the method, apparatus, and non-transitory computer-readable medium described herein may further include processes, features, means, or instructions for receiving an indication of the antenna gain from the UE.

Some examples of the method, apparatus, and non-transitory computer-readable medium described herein may further include processes, features, means, or instructions for calculating a conducted test threshold based on a difference between an EIRP value and the antenna gain, wherein the set of emission requirements comprise EIRP requirements.

Some examples of the method, apparatus, and non-transitory computer-readable medium described herein may further include processes, features, means, or instructions for transmitting, to the UE, the NS including an NS value associated with an antenna gain group that includes the antenna gain, wherein respective antenna gain groups comprise a range of antenna gain values that may be non-overlapping between the respective antenna gain groups.

Some examples of the method, apparatus, and non-transitory computer-readable medium described herein may further include processes, features, means, or instructions for transmitting, to the UE, the NS including an NS value associated with a plurality of antenna gain groups. In some examples of the method, apparatus, and non-transitory computer-readable medium described herein, the antenna gain may be greater than or equal to 0 dBi.

DETAILED DESCRIPTION

Figure 1:
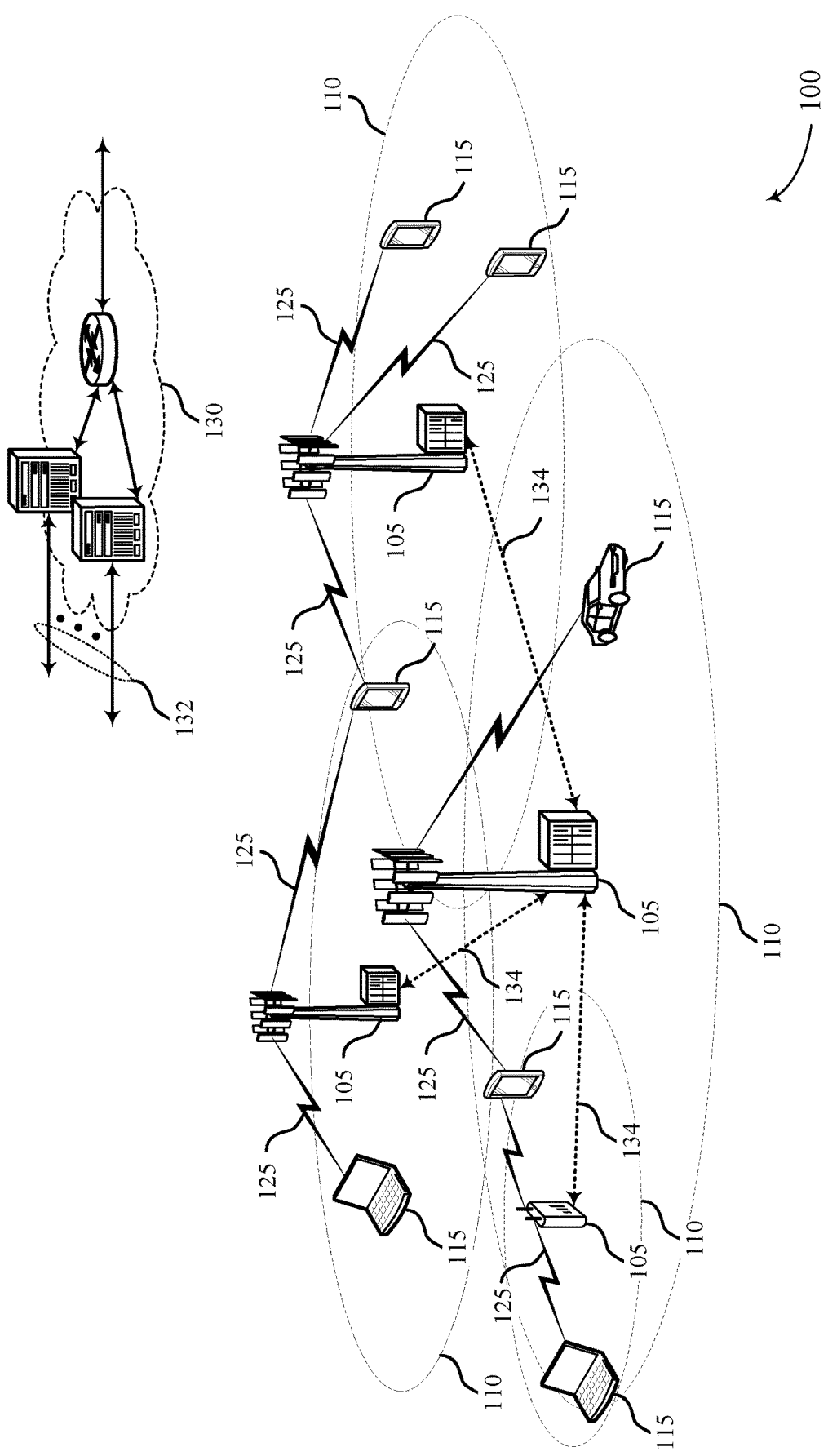
FIG. 1 illustrates an example of a system for wireless communication that supports compliance with regional regulatory requirements for UEs with positive antenna gain in accordance with aspects of the present disclosure.

Wireless devices may be regulated by standardized requirements pertaining to the operation and performance of the device. For example, a transmitting device may be required to use a maximum transmission output power that meets certain signal quality and spectral emission requirements for wireless communications. The device may accordingly be configured to satisfy standardized requirements for emissions (e.g., maximum emission power, spectrum emission mask, power spectral density, spurious emissions, receiver spurious emissions, etc.) which may be globally applicable to several different regions or locations. In such cases, a maximum power reduction (MPR) allowance may enable a wireless device to adjust its emissions and meet the standardized requirements, as needed.

Additionally, respective locations or regions may have additional, potentially more stringent, requirements that are applied on top of these standardized requirements. The standardized requirements may accordingly specify the application of additional requirements (e.g., additional requirements for spectrum emission mask, spurious emissions, and the like) in certain deployments. In such cases, a wireless device may also be required to satisfy additional region-specific requirements for wireless communications in a particular region. As an example, a particular region or location may utilize radio frequency (RF) bands that have a certain level of sensitivity to interference (e.g., public safety bands), and a user equipment (UE) may need to comply with a set of regional requirements to avoid interference on those RF bands. An additional MPR (A-MPR) allowance may be used by the UE to satisfy these regional requirements. Network signaling (NS) from a base station may enable a UE to identify an A-MPR once the UE is located in the corresponding region (e.g., when connecting to a cell).

The selection of an A-MPR for a wireless device to meet additional requirements may be based on an assumption of a certain antenna gain of the device. For example, an assumption of a 0 decibel-isotropic (dBi) gain for an antenna of a UE may be the basis of selecting an A-MPR to meet additional requirements such that regional regulatory requirements (e.g., equivalent isotropic radiated power (or effective isotropic radiated power) (EIRP) requirements) are also satisfied. This assumption may be reasonable for handheld devices (e.g., such as a mobile phone, a tablet, and the like) that may, for example, have a relatively small form factor. These devices may allow for simplified chipset implementation and validation such that antenna gains are at or near the assumed value. Accordingly, for a UE having zero or negative antenna gain, satisfying additional requirements using an A-MPR based on the 0 dBi assumption may likewise ensure that regional regulatory requirements are met without further regional certification (e.g., additional testing to ensure compliance with regional regulatory requirements).

However, UEs having a larger form factor (e.g., an automobile that is capable of vehicle-to-everything (V2X) communications), and therefore larger antennas, may have a higher link budget demand (e.g., as compared to handheld devices). A corresponding antenna gain for such UEs may thus be greater than or equal to the 0 dBi antenna gain assumption used for meeting additional requirements. As a result, when antenna gains are greater than or equal to 0 dBi, there may not be a guarantee that meeting the additional requirements will also meet regional regulatory requirements. In such cases, further certification may be needed, which may result in excess time and increased costs when deploying a device in a particular region. Accordingly, it may be desirable to utilize techniques that support A-MPR values based on an actual antenna gain of a UE, which may enable various types of UEs with different antenna gains (e.g., including V2X UEs) to meet regional regulatory requirements without further certification.

As described herein, techniques for complying with regional regulatory requirements may include the use of an antenna gain declared by a UE (such as a post antenna connector gain) and a set of emission requirements when determining an A-MPR. For instance, some UEs may have one or more external antennas used for wireless communications, where the antenna(s) may be located away from the UE's chipset and thus coupled with the chipset via an additional connector (e.g., a cable). As such, the antenna gain declared by a UE may represent a combination of a directional gain of the UE's antenna and losses associated with a cable between the UE's antenna and chipset, and a post antenna connector gain may thus take into account losses introduced by the addition of the cable between the antenna and chipset. A UE may accordingly declare at least one supported value of a post connector gain to meet regional regulatory requirements.

Additionally, different A-MPR values may be used for different antenna gains or different groups of antenna gains (e.g., for different ranges of possible antenna gains by different devices). These techniques may include matching additional requirements to be met by a UE with regional regulatory requirements (such as EIRP requirements). In such cases, a UE may satisfy additional requirements, in accordance with standardized requirements for spectrum emissions, as well as regional requirement through the same technique. For instance, standardized requirements may be defined to utilize EIRP requirements, and a threshold value that a UE is to satisfy may be based on the antenna gain of the UE subtracted from an EIRP requirement (such as a base or default A-MPR value). In such aspects, the EIRP requirements may be converted to conducted requirements by subtracting the post antenna connector gain from the EIRP requirements.

In aspects of the present disclosure, a UE may declare its antenna gain when the UE's chipset is tested. Additionally or alternatively, a UE may declare its antenna gain via receiving network signaling (NS) indicating a set of emission requirements from a base station based on the declared antenna gain (where additional requirements may be derived by subtracting the antenna gain from the EIRP requirements), and a corresponding A-MPR may be identified by the UE for output power adjustment that satisfies a threshold. Additionally or alternatively, the base station may provide a same NS value to all UEs, and each UE may determine an A-MPR based on the received NS and the UE's actual antenna gain. V2X UEs (or any devices that have a positive antenna gain) may therefore use such techniques to meet regional regulatory requirements. Such techniques may likewise enable the efficient deployment of various types of UEs having different antenna gains, without modifying the UE design or form factor for specific regions. In other words, a same UE design may be utilized in multiple regions, thereby avoiding excess costs associated with developing region-specific designs for UEs.

Aspects of the disclosure are initially described in the context of a wireless communications system. Aspects of the disclosure are further illustrated by and described with reference to apparatus diagrams, system diagrams, and flowcharts that relate to compliance with regional regulatory requirements for UEs with positive antenna gain.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support the use of A-MPR values that are based on a reported antenna gain of a wireless device when meeting additional requirements for spectrum emissions.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

A UE 115 may be an example of a vehicle that is capable of V2X communications. V2X communications may include a number of different communication applications where signals are transmitted between a vehicle and other devices (e.g., another UE 115) that may affect or communicate with the vehicle, including vehicle-to-infrastructure (V2I) communications, vehicle-to-vehicle (V2V) communications, vehicle-to-pedestrian (V2P) communications, vehicle-to-device (V2D) communications, vehicle-to-grid (V2G) communications, and the like. In some cases, V2X communications may include multiple devices autonomously accessing shared RF spectrum to transmit and/or receive data.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., S1, S2, etc.). Base stations 105 may communicate with one another over backhaul links 134 (e.g., X1, X2, etc.) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via n antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP)

layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (e.g., the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In wireless communications system 100, UEs 115 may be regulated by standardized requirements pertaining to the operation and performance of the device (e.g., requirements set forth by standards organizations, such as the 3rd Generation Partnership Project (3GPP)). For example, a transmitting UE 115 may be required to use a maximum emission power that meets certain signal quality and spectral emission requirements for wireless communications. The UE 115 may accordingly be configured to satisfy standardized requirements for spectrum emissions (e.g., including maximum output power, spectrum emission mask, power spectral density, spurious emissions, receiver spurious emissions, etc.), which may be globally applicable to a number of different regions or locations. In such cases, an MPR allowance may enable a UE 115 to decrease or adjust its emissions power and meet the standardized requirements, as needed.

For instance, the MPR allowance may be used by the UE 115 in cases where requirements on signal quality or out-of-bounds (OOB) emissions are in place.

Additionally, respective locations or regions (e.g., a city, a state, a country, etc.) may have additional, potentially more stringent, requirements that are applied on top of the standardized requirements. That is, the standardized requirements may specify the application of additional requirements in certain deployments. Thus, a UE 115 may also be required to satisfy additional region-specific requirements for wireless communications in that region. As an example, a particular region may have RF bands (e.g., frequency location information) that have a certain level of sensitivity to interference (e.g., public safety bands), and a UE 115 may need to comply with a set of regional requirements to avoid interference on those RF bands. In cases where additional adjacent channel leakage power ratio (ACLR) and spectrum emissions requirements need to be met, the network may signal that UE 115 needs to meet additional requirements (e.g., for a certain channel and/or bandwidth, a maximum output power may be defined). To meet these additional requirements, an A-MPR value may be used to further decrease a maximum output power in addition to an MPR. In such cases, an A-MPR allowance may be used by the UE 115 to satisfy the regional requirements, where NS may enable a UE 115 to identify an A-MPR once the UE 115 is located in the corresponding region (e.g., when connecting to a cell). The A-MPR may be utilized by the UE 115 to ensure an output power is maintained within a linear region of a power amplifier of the UE 115. Accordingly, the A-MPR may be used to lower the output power so that additional limits on any emissions (which may be expressed in terms of EIRP) are met by the UE 115.

The use of A-MPR by a wireless device to meet additional requirements may be based on an assumption of a certain antenna gain. For example, an assumption of a 0 dBi gain for an antenna of a UE 115 may be the basis of selecting an A-MPR to meet additional requirements, such that regional regulatory requirements (e.g., EIRP requirements) are also satisfied. EIRP requirements may relate to the amount of power that an isotropic antenna may theoretically emit to produce a peak power density in a direction of maximum antenna gain. This assumption may be reasonable for handheld devices (e.g., such as a mobile phone, a tablet computer, and the like) that may, for example, have a relatively small form factor. These devices may allow for simplified chipset implementation and validation such that antenna gains are at or near the assumed value. Accordingly, for a UE 115 having zero or negative antenna gain, satisfying additional requirements using an A-MPR based on the 0 dBi assumption may likewise ensure that regional regulatory requirements are met without further regional certification (e.g., additional testing to ensure compliance with regional regulatory requirements).

Wireless communications system 100 may support matching additional requirements for spectrum emissions with regional requirements and the use of an A-MPR based on an actual antenna gain of a UE 115. For example, a UE 115 that has a positive antenna gain (e.g., a V2X UE 115 with an antenna gain greater than or equal to 0 dBi) may be located in a particular region or geographic location and be required to meet additional regional requirements for wireless communications. In such cases, the UE 115 may receive network signaling from a nearby cell or base station 105 that indicates the additional requirements to be met. The UE 115 may also identify an antenna gain (e.g., a post connector antenna gain) for its antenna(s) and identify a set of emission requirements based on the identified antenna gain and the network signaling. Additionally, the UE 115 may identify an A-MPR based on the set of emission requirements and the antenna gain and may adjust a maximum emission power in accordance with the identified A-MPR. Through the adjustment of the maximum output power, the UE 115 may satisfy the additional requirements and regional regulatory requirements, where emissions of the UE 115 (e.g., maximum output power, spectrum emissions mask, power spectral density, spurious emissions, receiver spurious emissions, etc.) do not exceed a threshold requirement. In some examples, the threshold may be derived based on a difference between a regional requirement (e.g., an equivalent isotropic radiated power (EIRP)) and the identified antenna gain. As a result, the UE 115 may meet the regional requirements without the need for additional testing or certification in various different regions.

Figure 2:
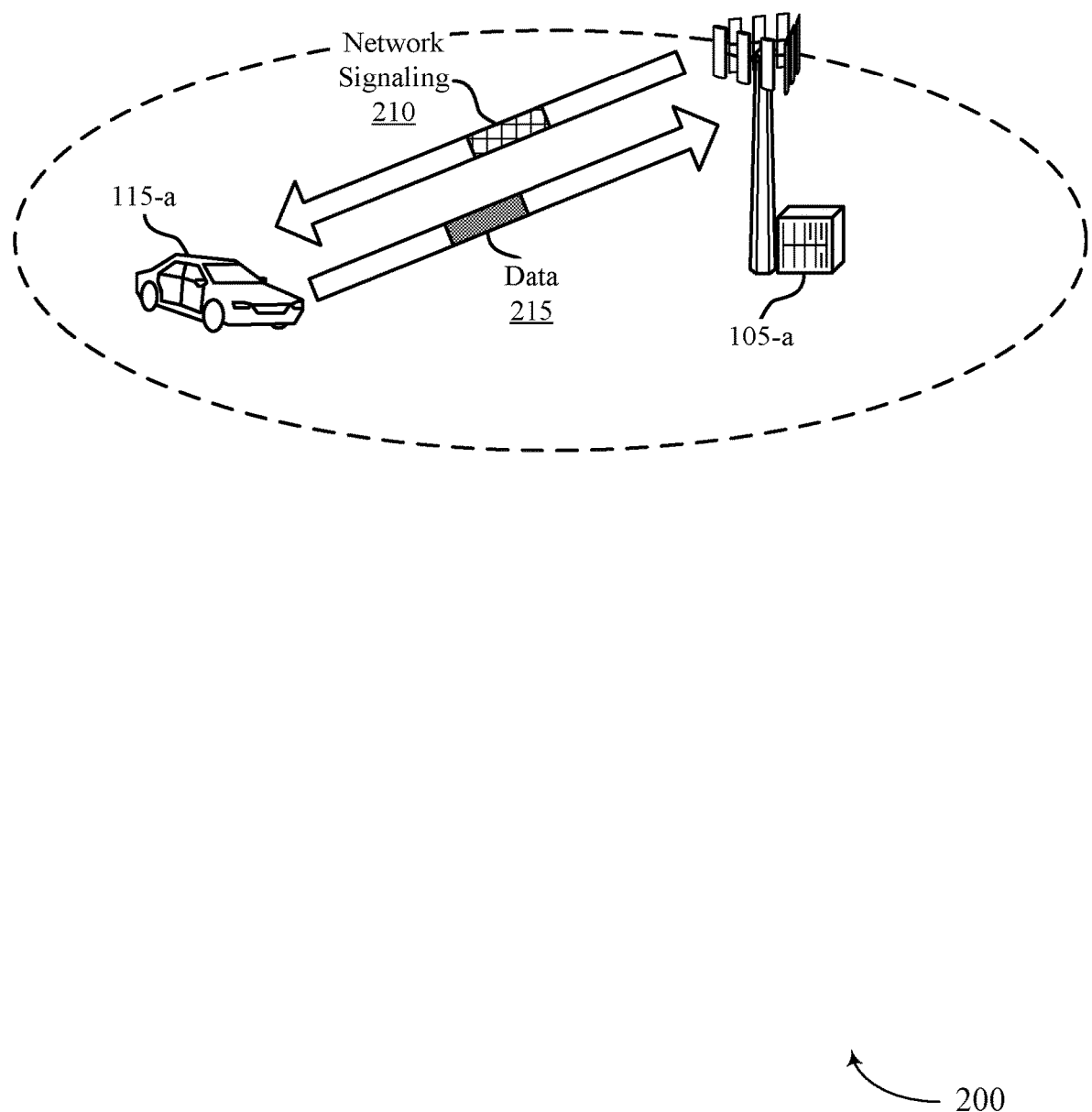
FIG. 2 illustrates an example of a wireless communications system that supports compliance with regional regulatory requirements for UEs with positive antenna gain in accordance with aspects of the present disclosure.

FIG. 2 illustrates an example of a wireless communications system 200 that supports compliance with regional regulatory requirements for UEs 115 with positive antenna gain in accordance with various aspects of the present disclosure. In some examples, wireless communications system 200 may implement aspects of wireless communications system 100. For example, wireless communications system 200 includes a base station 105-*a* and a UE 115-*a*, which may be examples of the corresponding devices described with reference to FIG. 1. Wireless communications system 200 may support the coherent identification of an A-MPR that is based on a set of emission requirements and an actual antenna gain of UE 115-*a*.

In some examples, UE 115-*a* may be a vehicle that communicates using V2X transmissions. In such cases, UE 115-*a* may have a larger form factor compared to handheld UEs 115. UE 115-*a* may therefore include a larger antenna and have a relatively higher link budget demand. In some cases, UE 115-*a* may also include an external antenna (e.g., an antenna that is not integrated within a chipset of UE 115-*a*). A corresponding antenna gain for UE 115-*a* may thus be greater than or equal to 0 dBi. Additionally, UE 115-*a* may be located in a region that has additional regional requirements that may be applied on top of standardized requirements that UE 115-*a* supports. Accordingly, UE 115-*a* may apply additional requirements, for example, for spectrum emissions, such that the regional requirements are also satisfied.

However, an antenna gain assumption (e.g., 0 dBi) used when meeting the additional requirements on top of the standardized requirements may not be accurate for UE 115-*a*. As a result, there may not be a guarantee that meeting the additional requirements will also meet the regional regulatory requirements. In such cases, further certification may be needed for UE 115-*a*, which may result in excess time and increased costs for deploying such a UE 115. Additionally, with an A-MPR allowance defined by the 0 dBi antenna gain assumption, the use of certain spectral requirements (such as an EIRP requirements) may result in more severe requirements placed on UE 115-*a* due to its large antenna gain (e.g., much greater than or equal to 0 dBi). As an example, UE 115-*a* having high antenna gain may need a larger A-MPI allowance than that provided when following the 0 dBi assumption to meet regional requirements. Accordingly, it may be desirable to utilize techniques that support A-MPR values based on an actual antenna gain of UE 115-*a* to obviate the need of additional testing or certification.

Wireless communications system 200 may support techniques for complying with regional regulatory requirements through the use of an actual antenna gain of UE 115-*a* and a set of emission requirements when determining an A-MPR. For example, UE 115-*a* may declare its antenna gain (e.g., such as a post antenna connector gain) when the UE's chipset is tested, additional requirements may be derived by subtracting the antenna gain from the EIRP requirements, and UE 115-*a* may determine an A-MPR based on emission requirements and the antenna gain.

In some examples, different A-MPR values may be used for different antenna gains or different groups of antenna gains. Such techniques may also support additional requirements that are matched with regional regulatory requirements (such as EIRP requirements). In such cases, when additional requirements are met in accordance with standardized requirements, regional regulatory requirements may also be met by using the same techniques. For instance, standardized requirements may be defined to utilize EIRP requirements, and a threshold value that UE 115-*a* is to satisfy (e.g., a conducted test threshold) may be based on the antenna gain of UE 115-*a* subtracted from the EIRP requirement. Using the described techniques, V2X UEs (such as UE 115-*a*, or any devices that have a positive antenna gain) may therefore meet regional regulatory requirements without further testing.

UE 115-*a* (or a manufacturer of UE 115-*a*) may declare the antenna gain for one or more antennas of UE 115-*a*. For example, UE 115-*a* may report the antenna gain to a testing system during a test (e.g., when testing for compliance), and, once passed, any antenna gain less than or equal to that declared may likewise be used in a given deployment for similar UEs 115. In some aspects, the declared antenna gain value may be from a set of discreet antenna gains (e.g., 0 dBi, 1 dBi, 2 dBi, 3 dBi, and so forth). When connecting to a cell, the antenna gain of UE 115-*a* may be indicated as a capability of UE 115-*a*, for example, within a field of a message or signaling sent from UE 115-*a* to base station 105-*a*. Accordingly, base station 105-*a* may be aware of the antenna gain of UE 115-*a*, and may be able to signal an indication of a set of emission requirements to UE 115-*a* based on the antenna gain. In other examples, and as described below, UE 115-*a* may refrain from sending an indication of its antenna gain to base station 105-*a*, but may still identify the A-MPR based on its antenna gain and a same NS 210 provided by base station 105-*a* to all UEs 115.

In some examples, different conducted requirements (e.g., requirements for a conducted test) for different antenna gains may be used to evaluate different A-MPR values. In such cases, a final A-MPR may be defined by grouping antenna gain values that have a similar evaluated A-MPR into respective groups. A same A-MPR allowance may then be specified for each group. Additionally, respective groups may include a range of antenna gains between a lowest gain (e.g., gainLow) and a highest gain (e.g., gainHigh).

Table 1 provides an illustrative example of different A-MPR allowances for different groupings of antenna gains for devices. For example, a first A-MPR allowance group (e.g., A-MPR1) may correspond to a first A-MPR value to be applied to meet additional requirements. The first A-MPR allowance group may include a first range of antenna gains and may be applicable to UE 115-*a* having an antenna gain within the first range. For instance, UE 115-*a* having an antenna gain that is less than gain1 (e.g., some antenna gain value) may accordingly identify an A-MPR corresponding to the first A-MPR allowance group (A-MPR1).

TABLE 1

| A-MPR Allowance Group | Antenna Gain Range |
|---|---|
| A-MPR1 | Antenna gain < gain1 |
| A-MPR2 | gain1 ≤ Antenna gain < gain2 |
| A-MPR3 | gain2 ≤ Antenna gain < gain3 |

Similarly, another UE 115 (not shown) having a higher antenna gain may correspond to an additional A-MPR allowance group, where any number of A-MPR allowance groups may be possible, each have a respective range of non-overlapping antenna gain values. For instance, a UE 115 having an antenna gain that is greater than or equal to gain1 but less than gain2 may utilize a second A-MPR allowance group (A-MPR2) and corresponding second A-MPR value when meeting additional requirements. Accordingly, wireless devices having different antenna gains may coherently identify an appropriate A-MPR to satisfy additional requirements and regional regulatory requirements.

As described above, UE 115-a may be instructed to meet the additional requirements through NS 210. For example, the NS 210 may be transmitted from base station 105-a or various NS values may be preconfigured at UE 115-a. Additionally or alternatively, the signaling may be provided by global navigation satellite system (GNSS) positioning (e.g., for UEs 115 that have the capability to do so, such as UE 115-a). In such cases, an NS value may be determined through a detected location or region, and the location may be detected through GNSS positioning signaling received at UE 115-a.

Different NS values for different antenna gains (or groups of antenna gains) may be used, and UE 115-a may determine which NS value to respond to based on its antenna gain. For example, base station 105-a may transmit an NS value based on the antenna gain of UE 115-a. Alternatively, a same NS value may be used for the respective groups, and UE 115-a may use its antenna gain to identify an A-MPR. For example, a same NS value may be transmitted by the network to all UEs 115 in a cell (e.g., including UE 115-a), and UE 115-a may use that NS value and the antenna gain of UE 115-a to determine an A-MPR. In such cases, excess NS values may not be needed to indicate a large number of different groups of A-MPR allowances. In any event, UE 115-a may determine the A-MPR value from a combination of the received NS 210 and its configured antenna gain, and may subsequently adjust a maximum transmission output power in accordance with the A-MPR. UE 115-a may send any transmissions of data 215 to base station 105-a using a transmission power that does not exceed the adjusted maximum output power.

In some examples, different techniques may be used that enable the application of additional requirements that match regional requirements. For example, a standardized requirement may be defined to utilize a set of emission requirements (e.g., EIRP requirements), where a conformance test may be performed using a radiated test. Additionally or alternatively, standardized requirement may utilize conducted requirements that assume a pessimistic antenna gain (e.g., 7 dBi) when adjusting for additional requirements. The pessimistic assumption for the antenna gain may result in a reduction of spectral emissions for certain channel bandwidths and may correspond to a change in A-MPR values based on the different antenna gain assumption.

Figure 3:
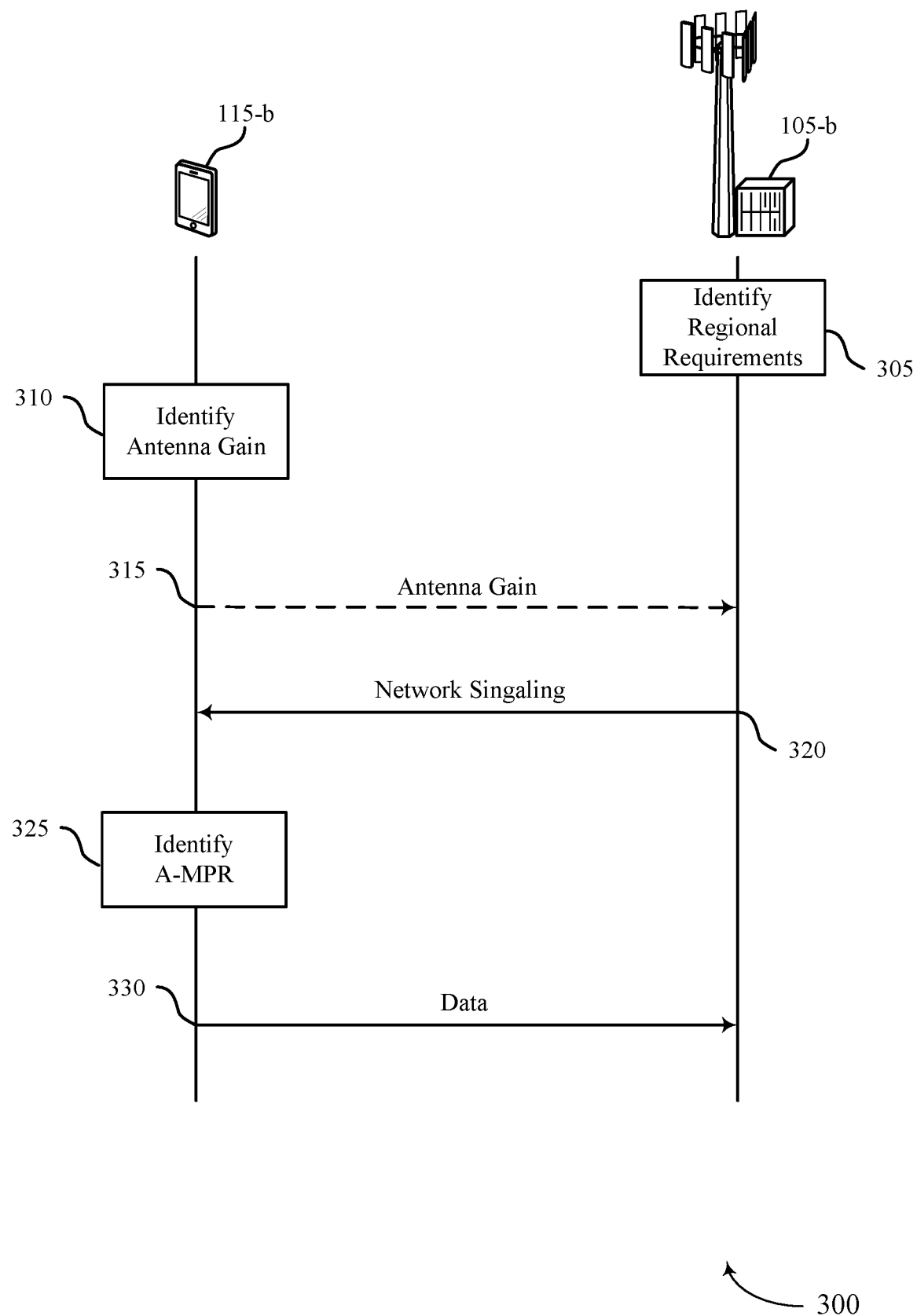
FIG. 3 illustrates an example of a process flow in a system that supports compliance with regional regulatory requirements for UEs with positive antenna gain in accordance with aspects of the present disclosure.

FIG. 3 illustrates an example of a process flow 300 in a system that supports compliance with regional regulatory requirements for UEs 115 with positive antenna gain in accordance with various aspects of the present disclosure. In some examples, process flow 300 may implement aspects of wireless communications system 100. For instance, process flow 300 includes UE 115-b and base station 105-b that may be examples of the corresponding devices described with reference to FIGS. 1 and 2. Process flow 300 may support the use of an A-MPR that is based on an antenna gain of UE 115-b and NS provided by base station 105-b.

At 305, base station 105-b may identify a set of emission requirements that UEs 115 may need to satisfy when operating within a cell provided by base station 105-b. For example, base station 105-b may be located in a region or geographic location that has more stringent requirements than those provided by standardized requirements (e.g., requirements agreed upon by telecommunications standards development organizations). Accordingly, base station 105-b may notify any UEs 115 (e.g., including UE 115-b) that connect to base station 105-b of the additional requirements to be met on top of the standardized requirements. In some cases, base station 105-b may identify the additional requirements such than an indication of the set of emission requirements may be signaled to UE 115-b (e.g., using an NS value).

At 310, UE 115-b may identify an antenna gain (e.g., a post connector antenna gain) of an antenna of UE 115-b. For example, UE 115-b may be an example of a vehicle with a particular form factor with a relatively large antenna gain (e.g., as compared to a handheld UE 115), and may therefore identify the gain associated with the antenna. In some examples, the antenna gain is greater than or equal to 0 dBi, such as an antenna gain of 7 dBi (or greater).

At 315, UE 115-b may optionally signal an indication of the identified antenna gain to base station 105-b. For example, UE 115-b may signal its capabilities to base station 105-b, where the capabilities may include an indication of the antenna gain for the antenna of UE 115-b. In other examples, the antenna gain of UE 115-b may be declared during testing (e.g., testing of the UE's chipset prior to deployment in a call) by a manufacturer of UE 115-b. At 320, base station 105-b may transmit, and UE 115-b may receive NS. In some cases, the NS may include an NS value associated with an antenna gain group. Additionally or alternatively, the NS value may include an NS value associated with multiple antenna gain groups. In some examples, UE 115-b may receive the NS via GNSS positioning signaling (not shown), or the NS values may be preconfigured at UE 115-b.

At 325, UE 115-b may identify an A-MPR based on the set of emission requirements and the antenna gain. The A-MPR may be used to satisfy regional regulatory requirements where UE 115-b is located. In some examples, UE 115-b may identify the A-MPR based on the antenna gain and the NS value. Additionally or alternatively, UE 115-b may identify an antenna gain group of multiple antenna gain groups, where the antenna gain group includes the antenna gain, and UE 115-b may subsequently identify the A-MPR based on the antenna gain group. In some cases, each of the respective antenna gain groups include a range of antenna gain values that are non-overlapping between the respective antenna gain groups. In such cases, each antenna group may have a range of values that are different and do not overlap from group to group. In other examples, the same NS may be signaled to UE 115-b (and to other UEs 115) and each UE 115 may choose the A-MPR based on the NS and the UE's own antenna gain. In some cases, UE 115-b may apply the A-MPR to satisfy a conducted test threshold, the conducted test threshold based on a difference between an EIRP value and the antenna gain, where the set of emission requirements may, for example, include EIRP requirements. At 330, UE 115-*b* may transmit data at an output power that is less than or equal to the maximum output power that is adjusted in accordance with the A-MPR. For instance, UE 115-*b* may apply the A-MPR and adjust an output power such that emissions of UE 115-*b* do not exceed the set of emission requirements (e.g., as defined by an EIRP).

Figure 4:
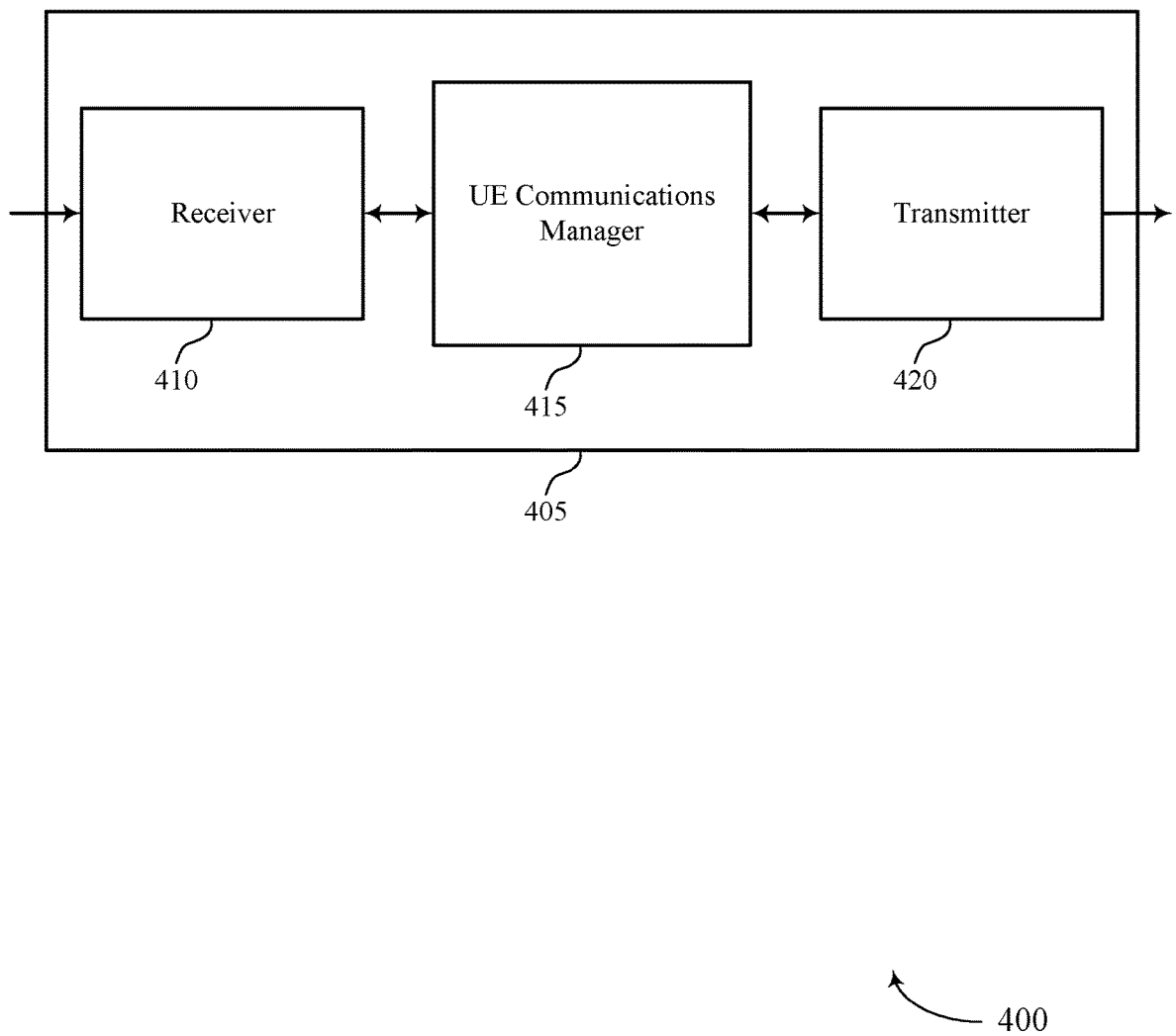
FIGS. 4 through 6 show block diagrams of a device that supports compliance with regional regulatory requirements for UEs with positive antenna gain in accordance with aspects of the present disclosure.

FIG. 4 shows a block diagram 400 of a wireless device 405 that supports compliance with regional regulatory requirements for UEs 115 with positive antenna gain in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to compliance with regional regulatory requirements for UEs 115 with positive antenna gain, etc.). Information may be passed on to other components of the device. The receiver 410 may be an example of aspects of the transceiver 735 described with reference to FIG. 7. The receiver 410 may utilize a single antenna or a set of antennas.

UE communications manager 415 may be an example of aspects of the UE communications manager 715 described with reference to FIG. 7. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may identify an antenna gain for an antenna of the UE 115, identify a set of emission requirements based on the antenna gain and NS received from a base station 105, identify an A-MPR based on the set of emission requirements and the antenna gain, the A-MPR used to satisfy regional regulatory requirements where the UE 115 is located, and transmit data using a maximum output power that is adjusted in accordance with the A-MPR.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
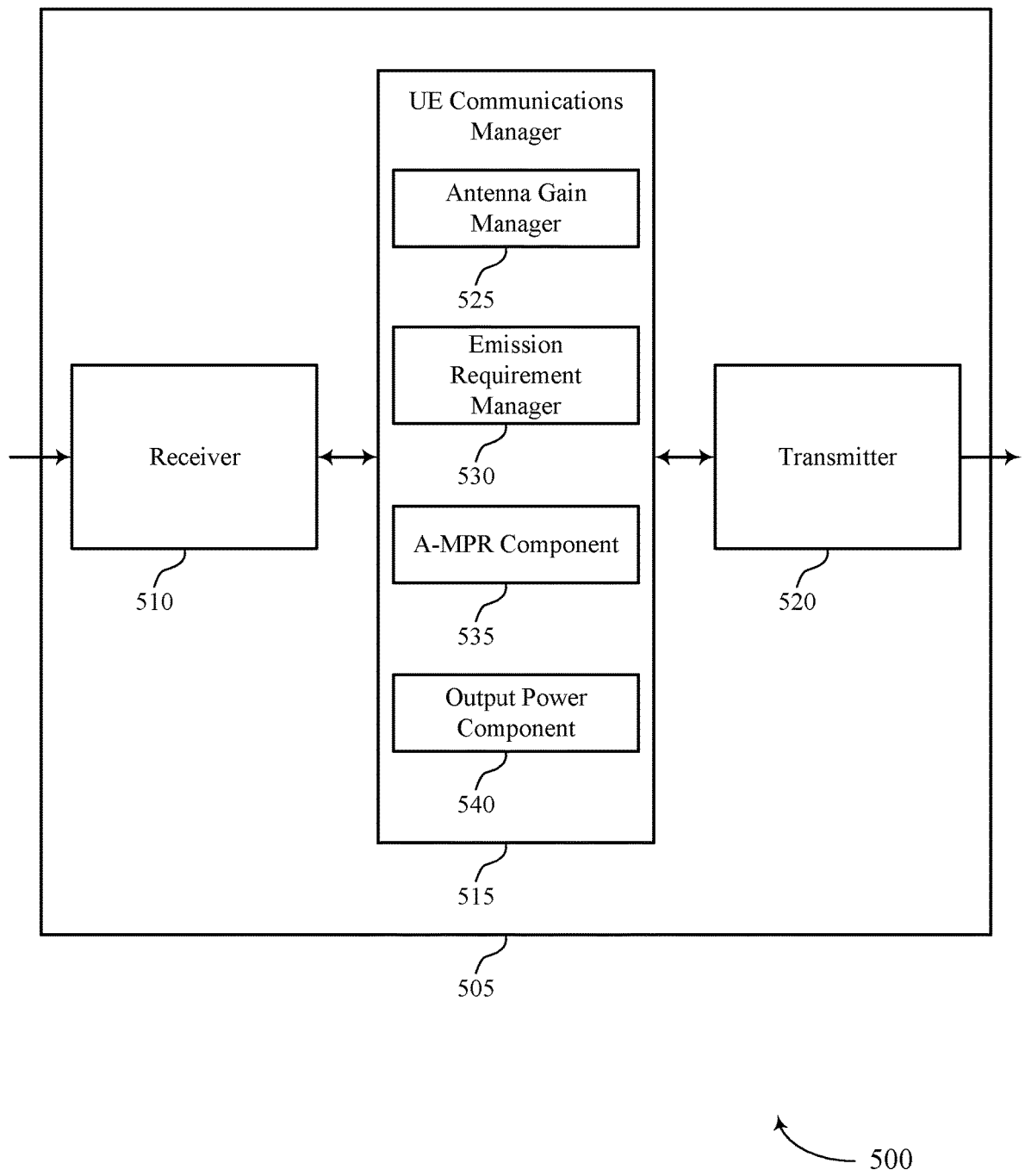

FIG. 5 shows a block diagram 500 of a wireless device 505 that supports compliance with regional regulatory requirements for UEs 115 with positive antenna gain in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to compliance with regional regulatory requirements for UEs 115 with positive antenna gain, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may also include antenna gain manager 525, emission requirement manager 530, A-MPR component 535, and output power component 540.

Antenna gain manager 525 may identify an antenna gain for an antenna of the UE 115. In some aspects, antenna gain manager 525 may transmit an indication of the antenna gain to the base station 105. Additionally or alternatively, antenna gain manager 525 may declare the antenna gain during a conducted test. In some cases, the antenna gain is greater than or equal to 0 dBi. Emission requirement manager 530 may identify a set of emission requirements based on the antenna gain and NS received from a base station 105.

A-MPR component 535 may identify an A-MPR based on the set of emission requirements and the antenna gain, the A-MPR used to satisfy regional regulatory requirements where the UE 115 is located. In some examples, A-MPR component 535 may identify the A-MPR based on the antenna gain and the NS value. In some cases, A-MPR component 535 may identify an antenna gain group of the set of antenna gain groups, the antenna gain group including the antenna gain, and identify the A-MPR based on the antenna gain group. In some cases, the A-MPR is from a set of A-MPR values, different A-MPR values of the set of A-MPR values corresponding to respective antenna gain groups. In some cases, each of the respective antenna gain groups include a range of antenna gain values that are non-overlapping between the respective antenna gain groups.

Output power component 540 may apply the A-MPR to satisfy a conducted test threshold, the conducted test threshold based on a difference between an EIRP value and the antenna gain, where the set of emission requirements includes EIRP requirements. In some cases, output power component 540 may transmit data using a maximum output power that is adjusted in accordance with the A-MPR, and transmit the data using a V2X transmission.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
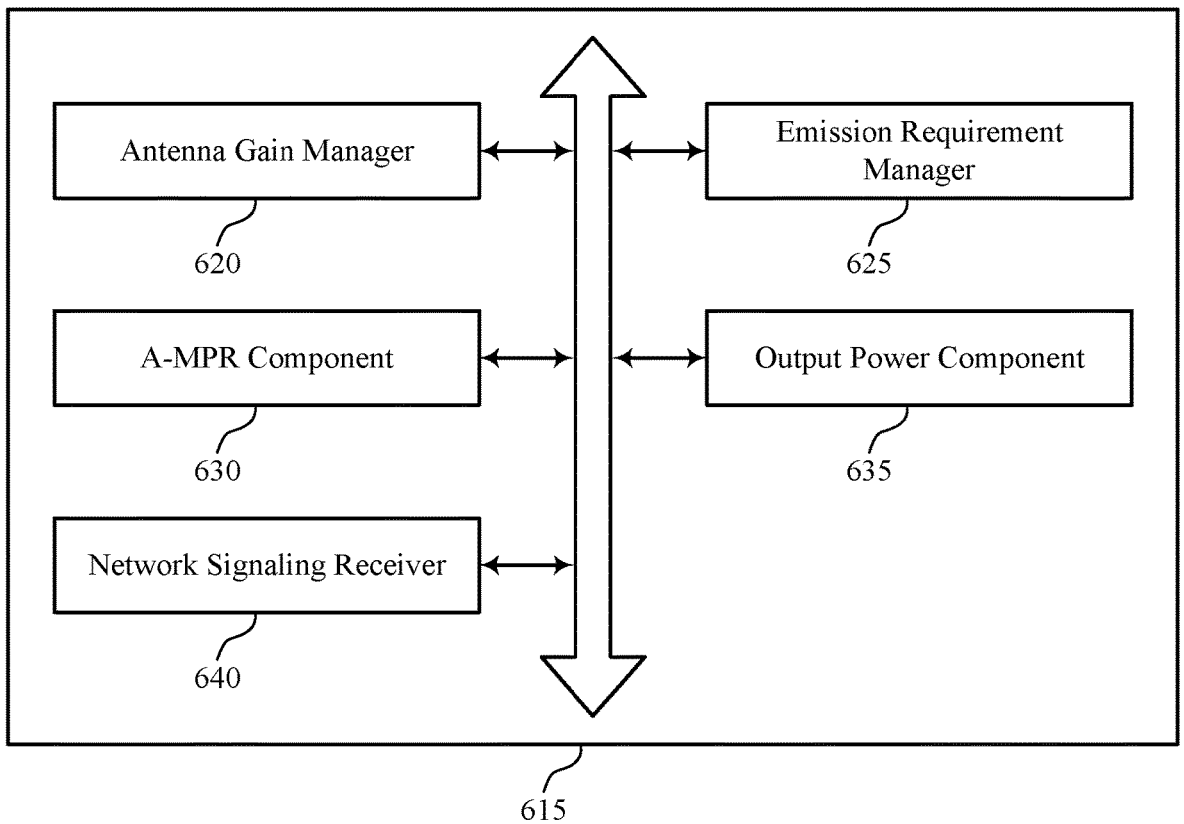

FIG. 6 shows a block diagram 600 of a UE communications manager 615 that supports compliance with regional regulatory requirements for UEs 115 with positive antenna gain in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include antenna gain manager 620, emission requirement manager 625, A-MPR component 630, output power component 635, and network signaling receiver 640. Each of these modules may communicate, directly or indirectly, with one another (e.g., via one or more buses).

Antenna gain manager 620 may identify an antenna gain for an antenna of the UE 115 and transmit an indication of the antenna gain to the base station 105. In some cases, the antenna gain is greater than or equal to 0 dBi. Emission requirement manager 625 may identify a set of emission requirements based on the antenna gain and NS received from a base station 105.

A-MPR component 630 may identify an A-MPR based on the set of emission requirements and the antenna gain, the A-MPR used to satisfy regional regulatory requirements where the UE 115 is located. In some examples, A-MPR component 535 may identify the A-MPR based on the antenna gain and the NS value. In some cases, A-MPR component 630 may identify an antenna gain group of the set of antenna gain groups, the antenna gain group including the antenna gain, and identify the A-MPR based on the antenna gain group. In some cases, the A-MPR is from a set of A-MPR values, different A-MPR values of the set of A-MPR values corresponding to respective antenna gain groups. In some cases, each of the respective antenna gain groups include a range of antenna gain values that are non-overlapping between the respective antenna gain groups.

Output power component 635 may apply the A-MPR to satisfy a conducted test threshold, the conducted test threshold based on a difference between an EIRP value and the antenna gain, where the set of emission requirements includes EIRP requirements. In some cases, output power component 635 may transmit data using a maximum output power that is adjusted in accordance with the A-MPR, and transmit the data using a V2X transmission.

Network signaling receiver 640 may receive, from the base station 105, the NS including an NS value associated with an antenna gain group that includes the antenna gain. In some cases, network signaling receiver 640 may receive, from the base station 105, the NS including an NS value associated with a set of antenna gain groups. Additionally or alternatively, the network signaling receiver 640 may determine a region that the UE 115 is located in based on GNSS positioning signaling, and identify the NS based on the determined region.

Figure 7:
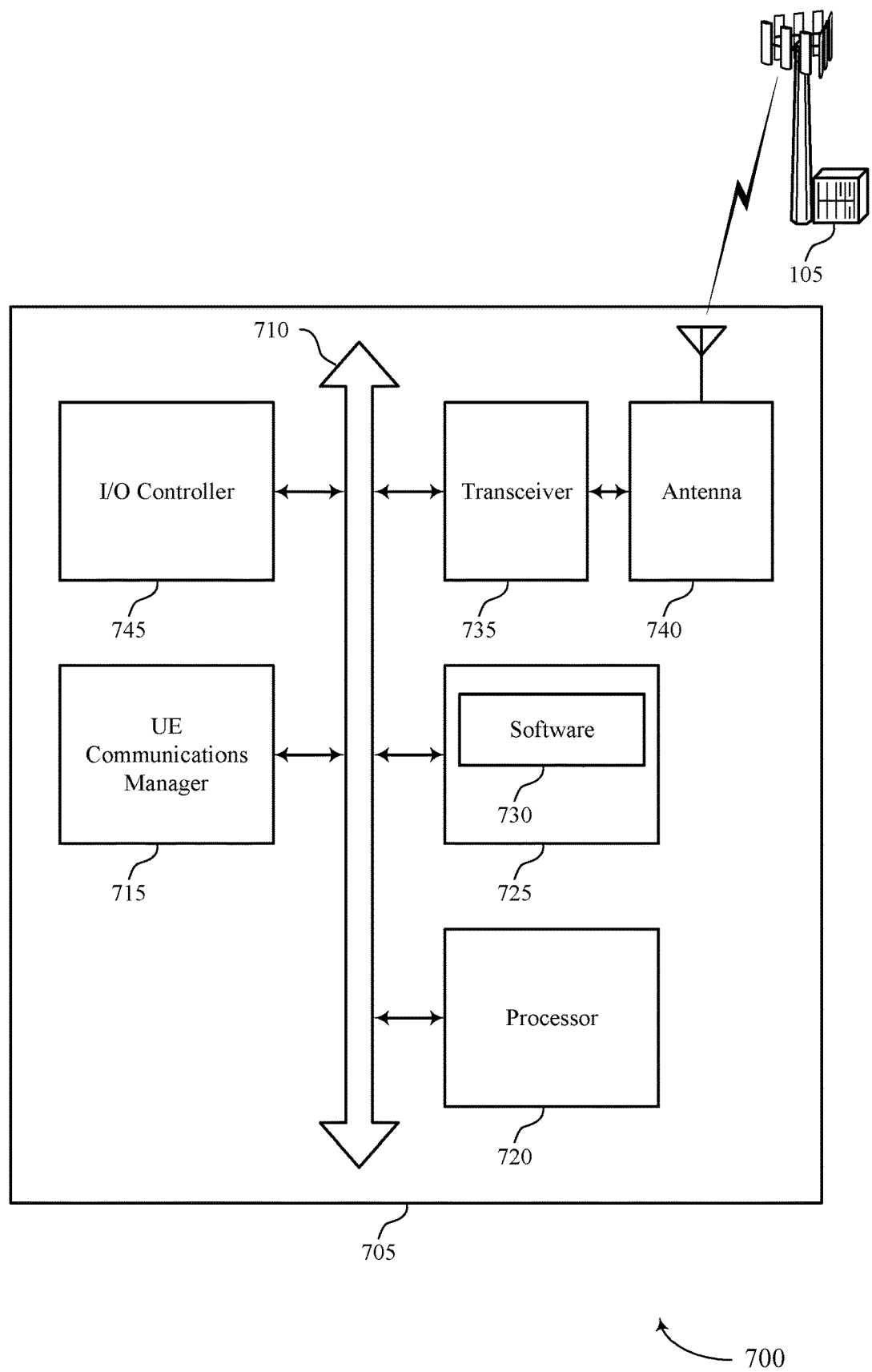
FIG. 7 illustrates a block diagram of a system including a UE that supports compliance with regional regulatory requirements for UEs with positive antenna gain in accordance with aspects of the present disclosure.

FIG. 7 shows a diagram of a system 700 including a device 705 that supports compliance with regional regulatory requirements for UEs 115 with positive antenna gain in accordance with aspects of the present disclosure. Device 705 may be an example of or include the components of wireless device 405, wireless device 505, or a UE 115 as described herein, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting compliance with regional regulatory requirements for UEs 115 with positive antenna gain).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support compliance with regional regulatory requirements for UEs 115 with positive antenna gain. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described herein. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
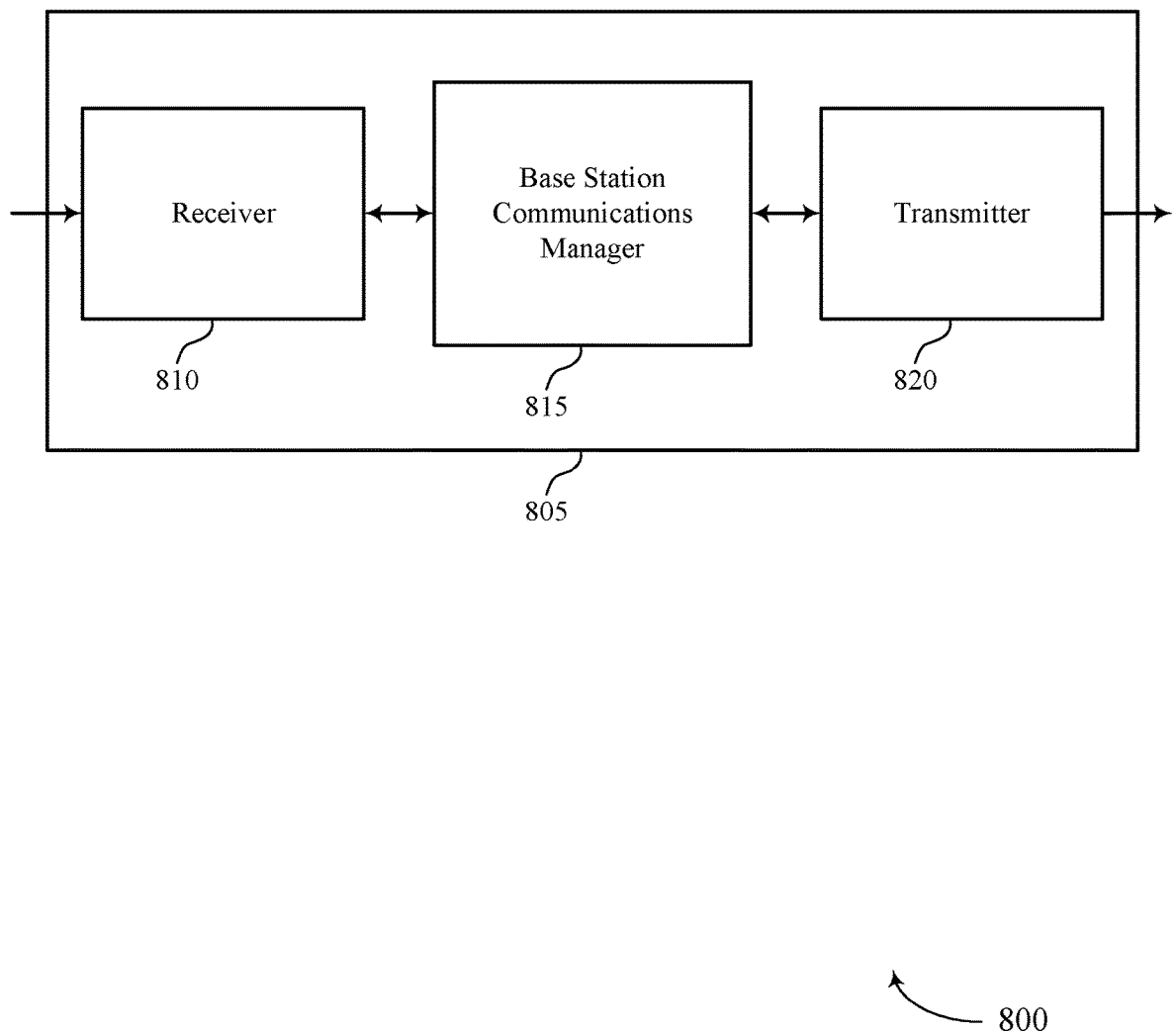
FIGS. 8 through 10 show block diagrams of a device that supports compliance with regional regulatory requirements for UEs with positive antenna gain in accordance with aspects of the present disclosure.

FIG. 8 shows a block diagram 800 of a wireless device 805 that supports compliance with regional regulatory requirements for UEs 115 with positive antenna gain in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to compliance with regional regulatory requirements for UEs 115 with positive antenna gain, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may identify a set of emission requirements based on an antenna gain associated with an antenna of a UE 115, the set of emission requirements to satisfy regional regulatory requirements where the UE 115 is located and transmit, to the UE 115, NS including an indication of the set of emission requirements.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
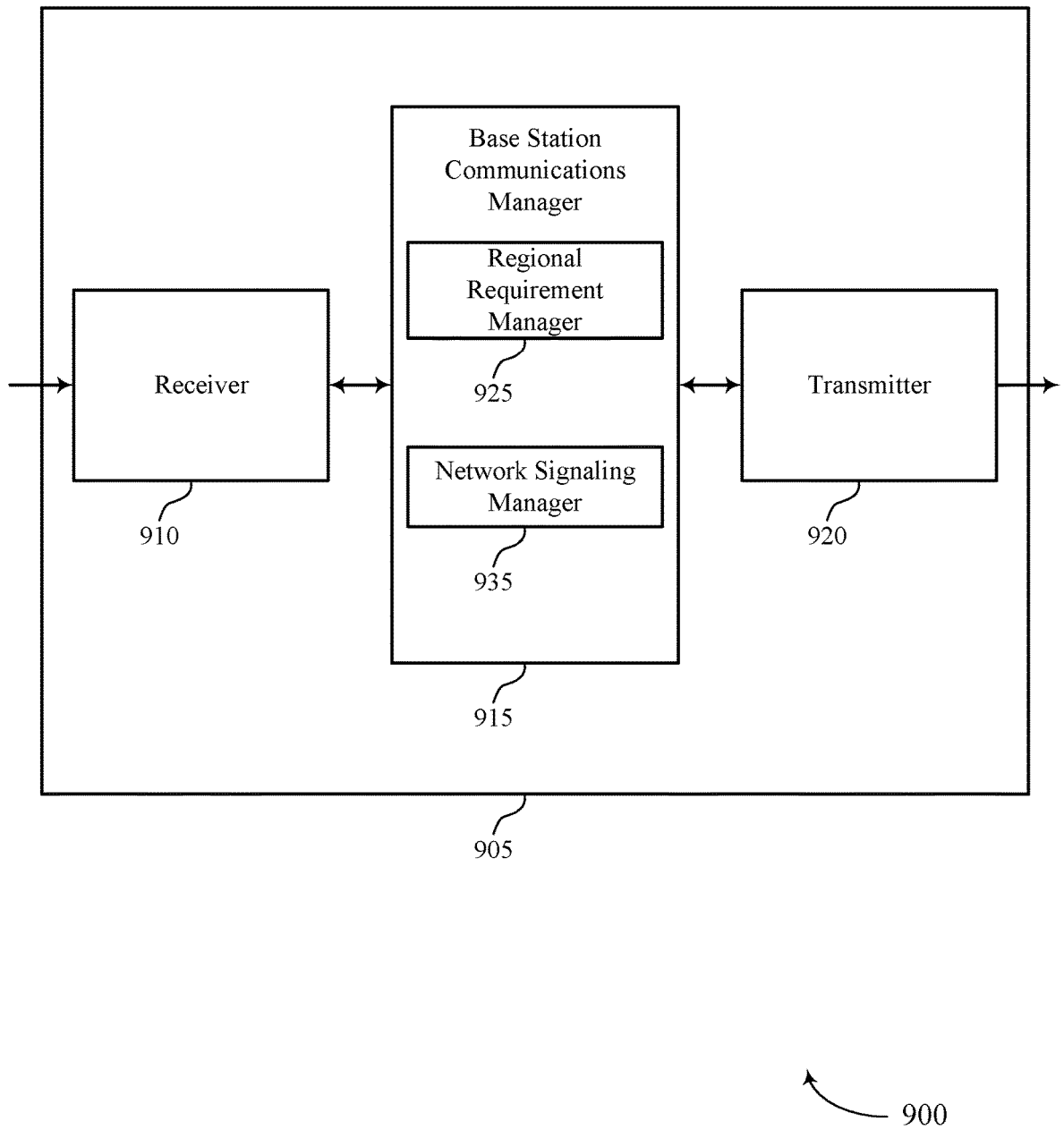

FIG. 9 shows a block diagram 900 of a wireless device 905 that supports compliance with regional regulatory requirements for UEs 115 with positive antenna gain in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to compliance with regional regulatory requirements for UEs 115 with positive antenna gain, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 may also include regional requirement manager 925 and network signaling manager 935.

Regional requirement manager 925 may identify a set of emission requirements based on an antenna gain associated with an antenna of a UE 115, the set of emission requirements to satisfy regional regulatory requirements where the UE 115 is located. In some cases, the antenna gain is greater than or equal to 0 dBi.

Network signaling manager 935 may transmit, to the UE 115, NS including an indication of the set of emission requirements, transmit, to the UE 115, the NS including an NS value associated with an antenna gain group that includes the antenna gain. In some examples, network signaling manager 935 may transmit, to the UE 115, the NS including an NS value associated with a set of antenna gain groups. In some cases, respective antenna gain groups include a range of antenna gain values that are non-overlapping between the respective antenna gain groups.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
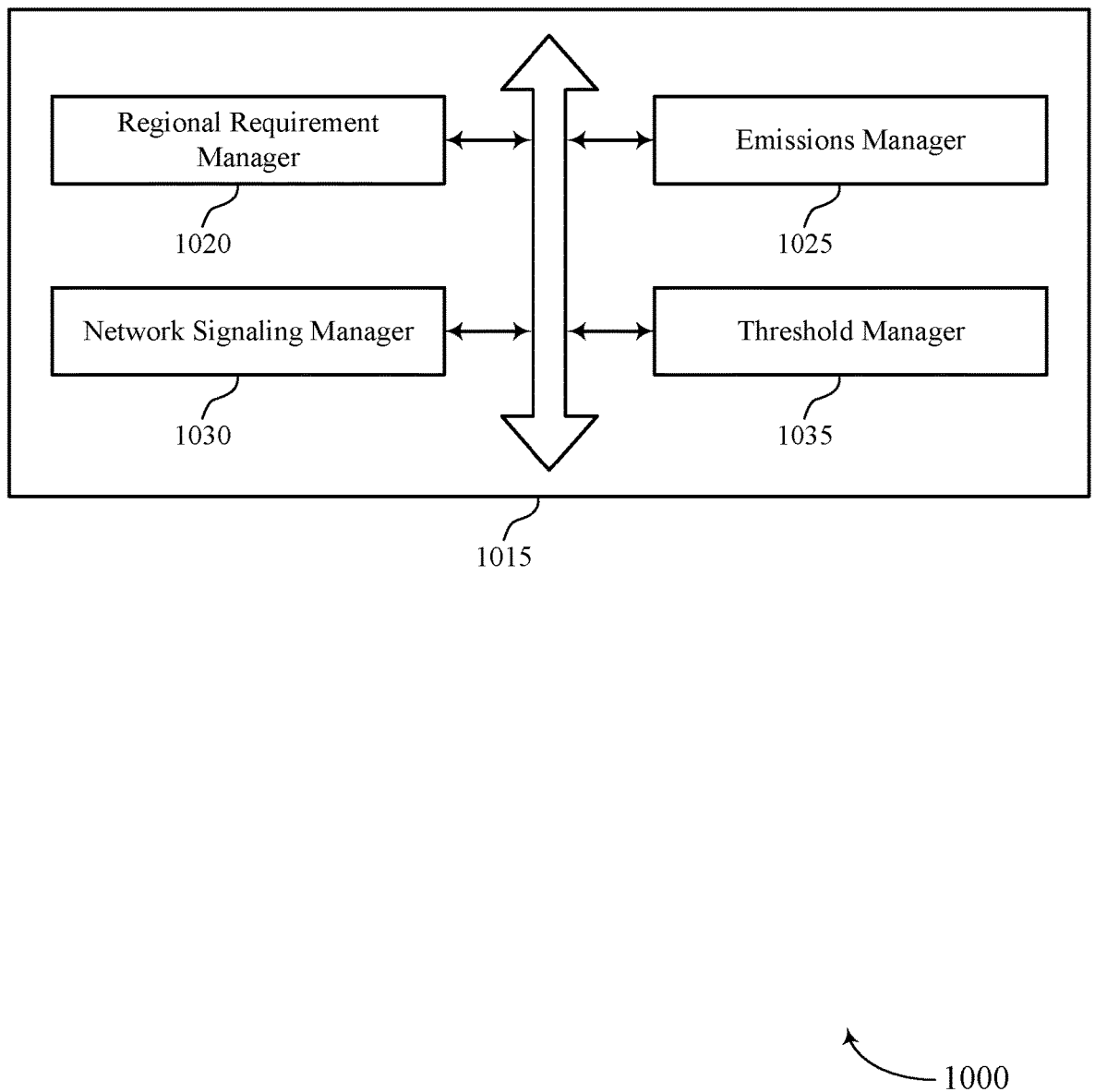

FIG. 10 shows a block diagram 1000 of a base station communications manager 1015 that supports compliance with regional regulatory requirements for UEs 115 with positive antenna gain in accordance with aspects of the present disclosure. The base station communications manager 1015 may be an example of aspects of a base station communications manager 1115 described with reference to FIGS. 8, 9, and 11. The base station communications manager 1015 may include regional requirement manager 1020, emissions manager 1025, network signaling manager 1030, and threshold manager 1035. Each of these modules may communicate, directly or indirectly, with one another (e.g., via one or more buses).

Regional requirement manager 1020 may identify a set of emission requirements based on an antenna gain associated with an antenna of a UE 115, the set of emission requirements to satisfy regional regulatory requirements where the UE 115 is located. In some cases, the antenna gain is greater than or equal to 0 dBi. Emissions manager 1025 may receive an indication of the antenna gain from the UE 115.

Network signaling manager 1030 may transmit, to the UE 115, NS including an indication of the set of emission requirements, transmit, to the UE 115, the NS including an NS value associated with an antenna gain group that includes the antenna gain. In some examples, network signaling manager 935 may transmit, to the UE 115, the NS including an NS value associated with a set of antenna gain groups. In some examples, respective antenna gain groups include a range of antenna gain values that are non-overlapping between the respective antenna gain groups Threshold manager 1035 may calculate a conducted test threshold based on a difference between an EIRP value and the antenna gain, where the set of emission requirements include EIRP requirements.

Figure 11:
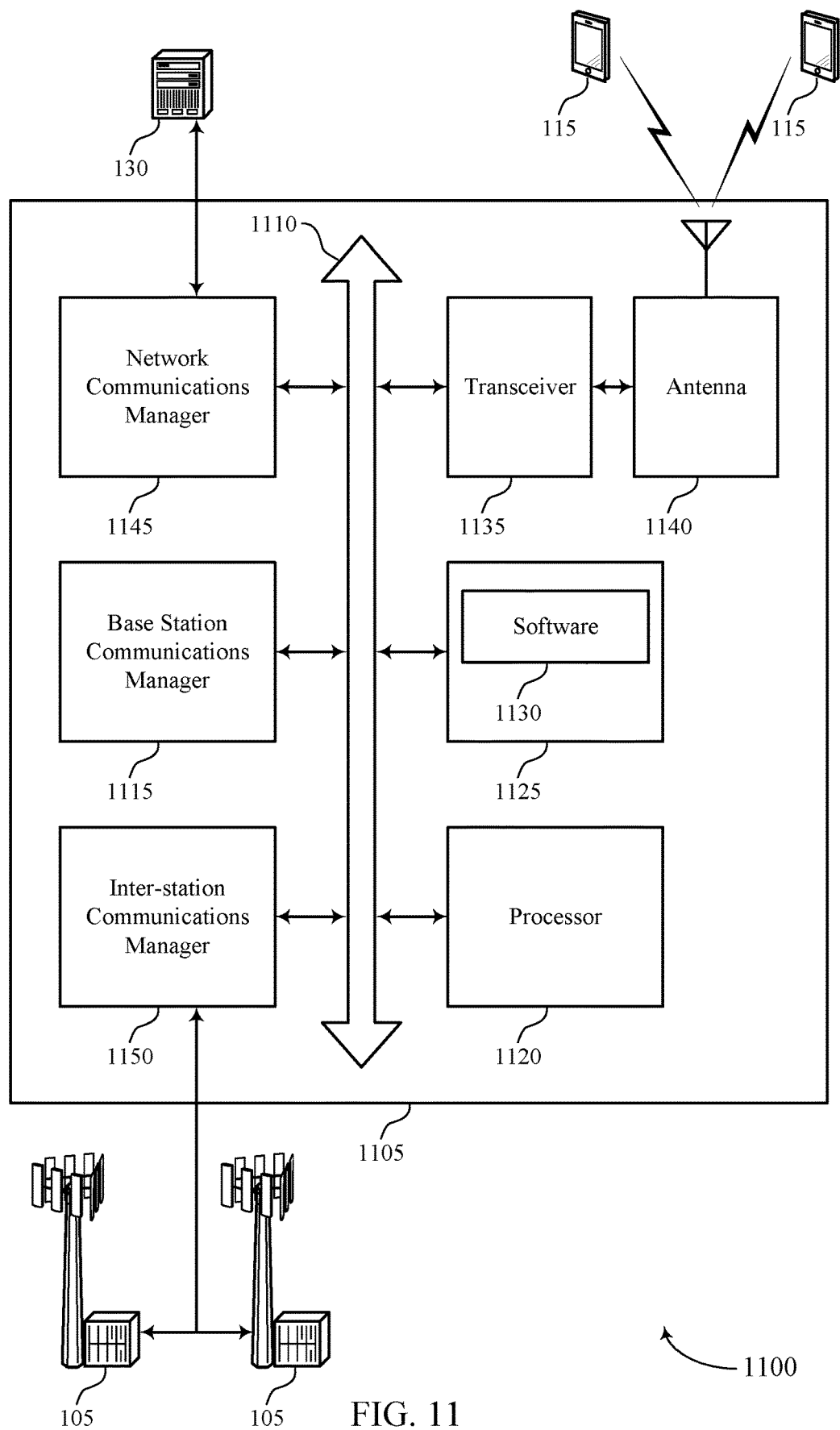
FIG. 11 illustrates a block diagram of a system including a base station that supports compliance with regional regulatory requirements for UEs with positive antenna gain in accordance with aspects of the present disclosure.

FIG. 11 shows a diagram of a system 1100 including a device 1105 that supports compliance with regional regulatory requirements for UEs 115 with positive antenna gain in accordance with aspects of the present disclosure. Device 1105 may be an example of or include the components of base station 105 as described herein, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting compliance with regional regulatory requirements for UEs 115 with positive antenna gain).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support compliance with regional regulatory requirements for UEs 115 with positive antenna gain. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within a Long Term Evolution (LTE)/LTE-A wireless communication network technology to provide communication between base stations 105.

Figure 12:
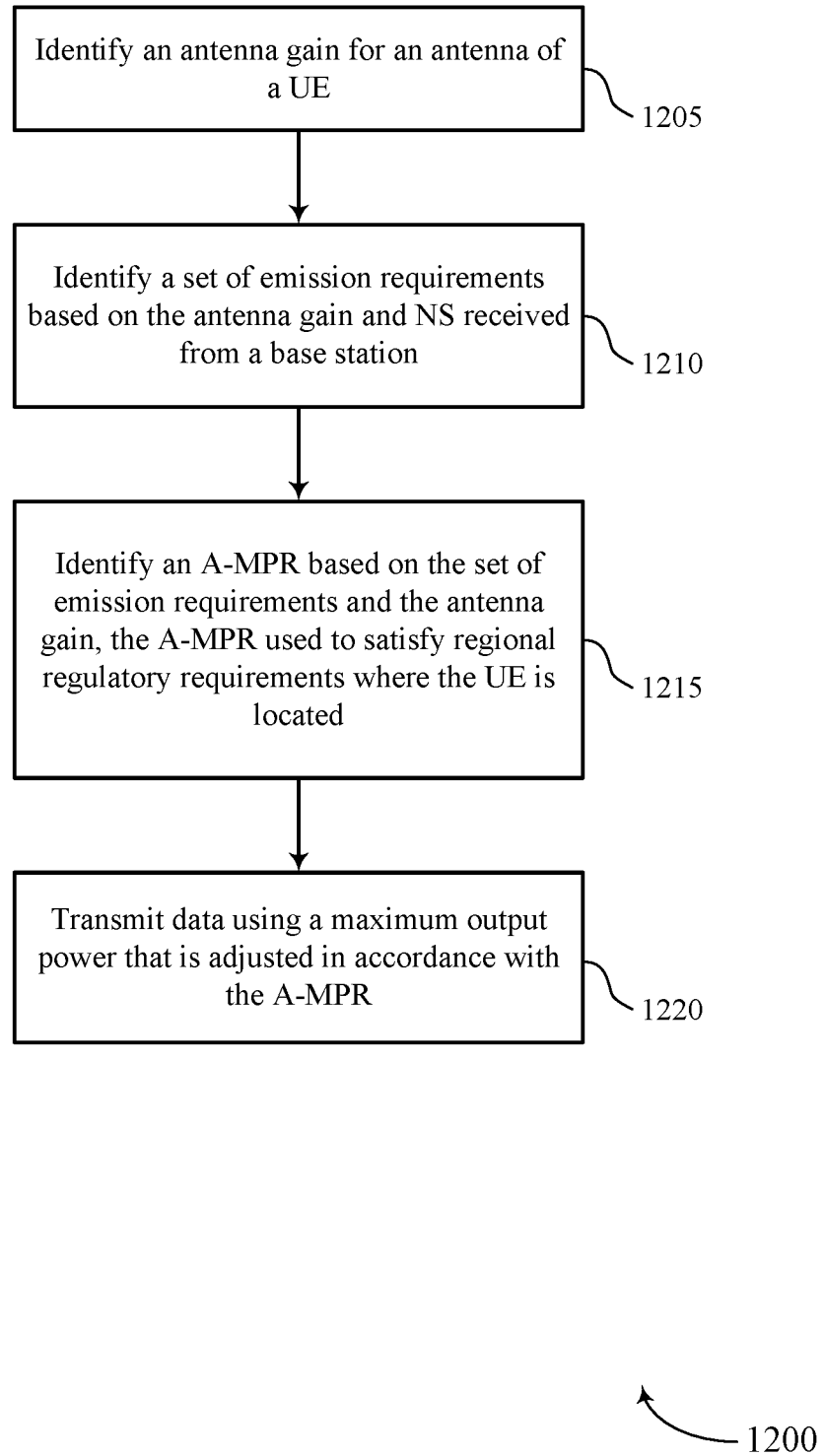
FIGS. 12 through 16 illustrate methods for compliance with regional regulatory requirements for UEs with positive antenna gain in accordance with aspects of the present disclosure.

FIG. 12 shows a flowchart illustrating a method 1200 for compliance with regional regulatory requirements for UEs 115 with positive antenna gain in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At 1205 the UE 115 may identify an antenna gain (e.g., a post connector antenna gain) for an antenna of the UE 115. The operations of 1205 may be performed according to the methods described herein. In certain examples, aspects of the operations of 1205 may be performed by an antenna gain manager as described with reference to FIGS. 4 through 7.

At 1210 the UE 115 may identify a set of emission requirements based at least in part on the antenna gain and NS received from a base station 105. The operations of 1210 may be performed according to the methods described herein. In certain examples, aspects of the operations of 1210 may be performed by an emission requirement manager as described with reference to FIGS. 4 through 7.

At 1215 the UE 115 may identify an A-MPR based at least in part on the set of emission requirements and the antenna gain, the A-MPR used to satisfy regional regulatory requirements where the UE 115 is located. The operations of 1215 may be performed according to the methods described herein. In certain examples, aspects of the operations of 1215 may be performed by a A-MPR component as described with reference to FIGS. 4 through 7.

At 1220 the UE 115 may transmit data using a maximum output power that is adjusted in accordance with the A-MPR. The operations of 1220 may be performed according to the methods described herein. In certain examples, aspects of the operations of 1220 may be performed by an output power component as described with reference to FIGS. 4 through 7.

Figure 13:
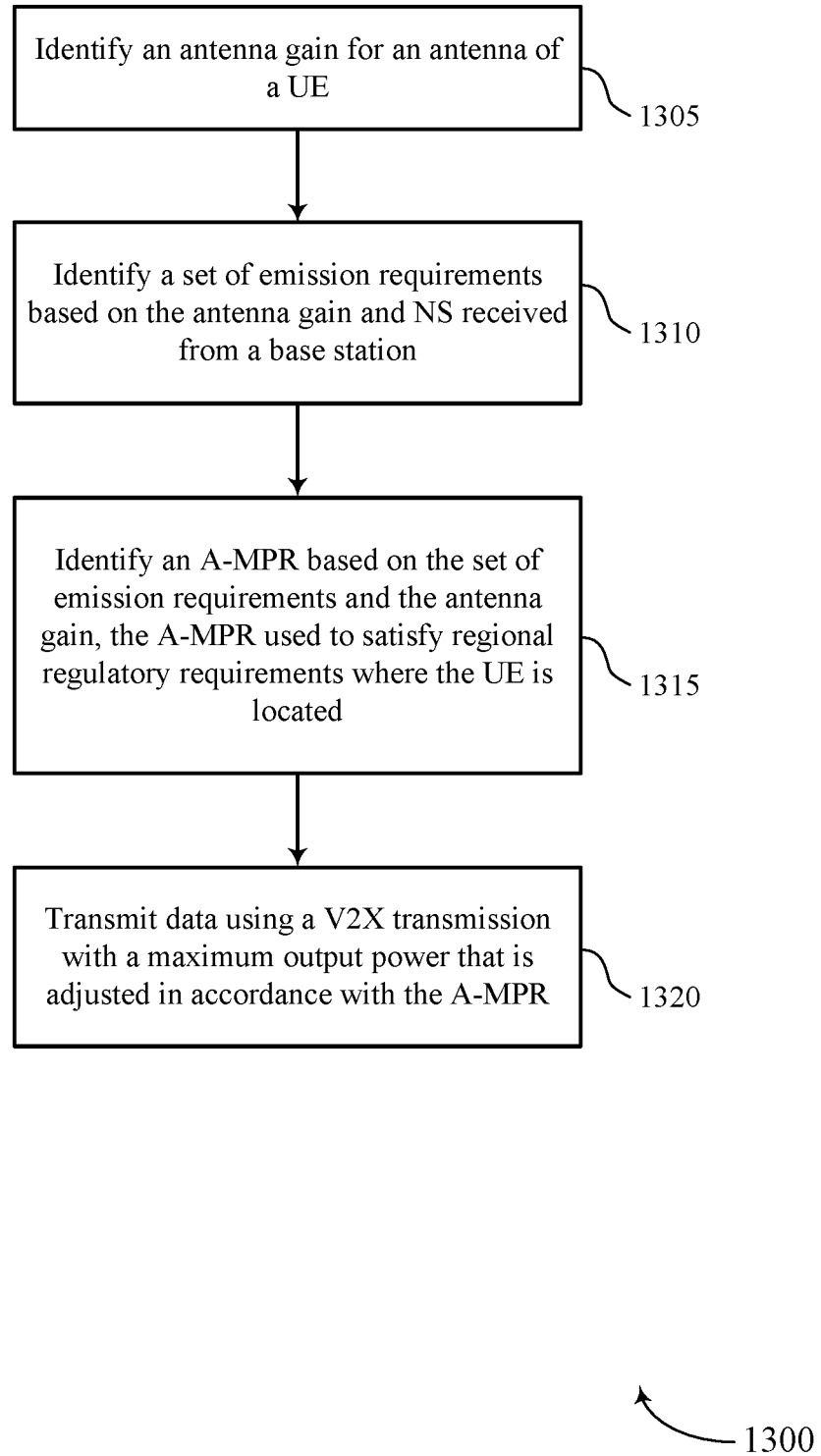

FIG. 13 shows a flowchart illustrating a method 1300 for compliance with regional regulatory requirements for UEs 115 with positive antenna gain in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At 1305 the UE 115 may transmit an indication of the antenna gain to the base station 105. The operations of 1305 may be performed according to the methods described herein. In certain examples, aspects of the operations of 1305 may be performed by an antenna gain manager as described with reference to FIGS. 4 through 7.

At 1310 the UE 115 may identify a set of emission requirements based at least in part on the antenna gain and NS received from a base station 105. The operations of 1310 may be performed according to the methods described herein. In certain examples, aspects of the operations of 1310 may be performed by an emission requirement manager as described with reference to FIGS. 4 through 7.

At 1315 the UE 115 may identify an A-MPR based at least in part on the set of emission requirements and the antenna gain, the A-MPR used to satisfy regional regulatory requirements where the UE 115 is located. The operations of 1315 may be performed according to the methods described herein. In certain examples, aspects of the operations of 1315 may be performed by a A-MPR component as described with reference to FIGS. 4 through 7.

At 1320 the UE 115 may transmit data using a V2X transmission with a maximum output power that is adjusted in accordance with the A-MPR. The operations of 1320 may be performed according to the methods described herein. In certain examples, aspects of the operations of 1320 may be performed by an output power component as described with reference to FIGS. 4 through 7.

Figure 14:
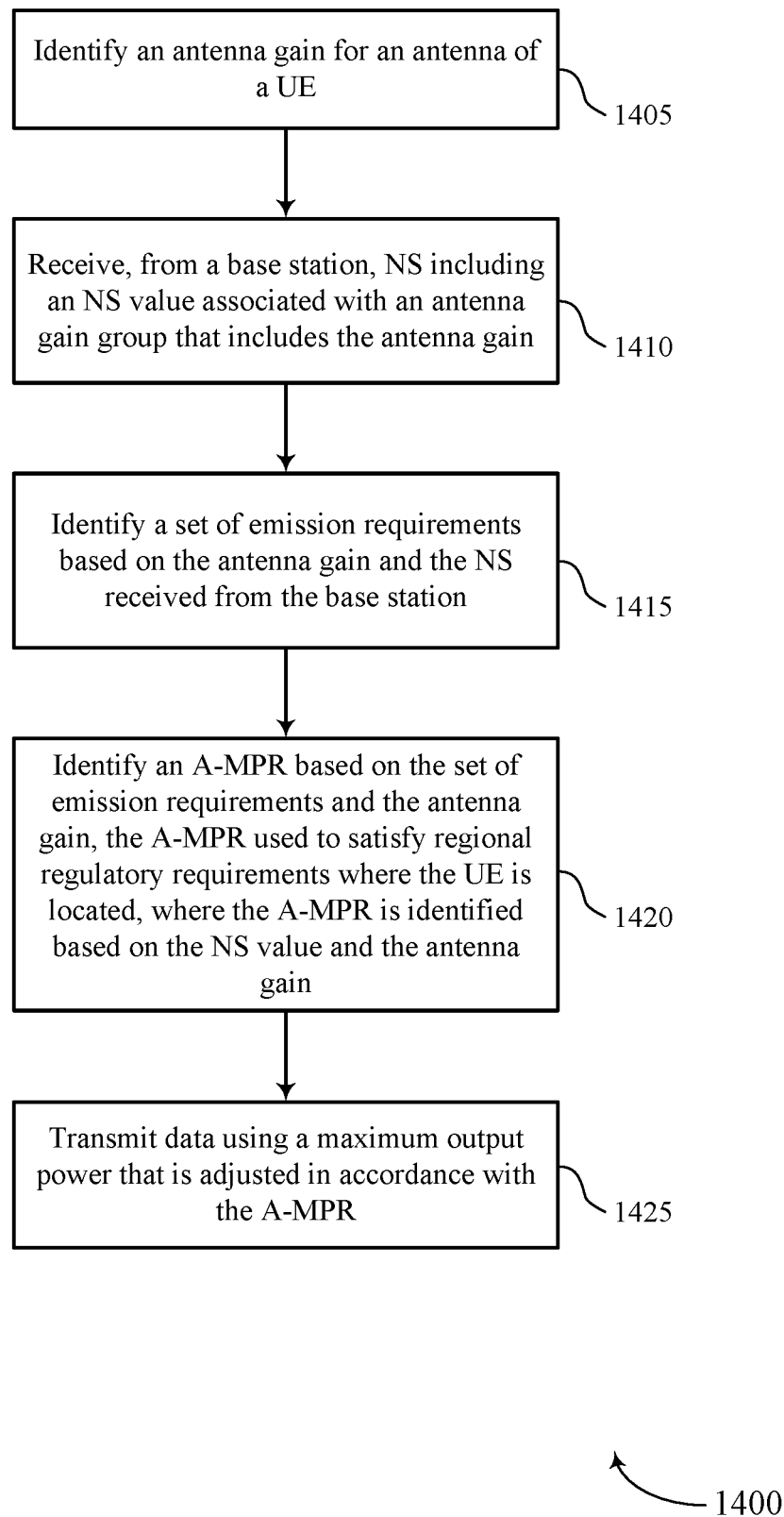

FIG. 14 shows a flowchart illustrating a method 1400 for compliance with regional regulatory requirements for UEs 115 with positive antenna gain in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may identify an antenna gain for an antenna of the UE 115. The operations of 1405 may be performed according to the methods described herein. In certain examples, aspects of the operations of 1405 may be performed by an antenna gain manager as described with reference to FIGS. 4 through 7.

At 1410 the UE 115 may receive, from a base station 105, NS including an NS value associated with an antenna gain group that includes the antenna gain. The operations of 1410 may be performed according to the methods described herein. In certain examples, aspects of the operations of 1410 may be performed by a network signaling receiver as described with reference to FIGS. 4 through 7.

At 1415 the UE 115 may identify a set of emission requirements based at least in part on the antenna gain and the NS received from the base station 105. The operations of 1415 may be performed according to the methods described herein. In certain examples, aspects of the operations of 1415 may be performed by an emission requirement manager as described with reference to FIGS. 4 through 7.

At 1420 the UE 115 may identify an A-MPR based at least in part on the set of emission requirements and the antenna gain, the A-MPR used to satisfy regional regulatory requirements where the UE 115 is located, where the A-MPR is identified based on the NS value and the antenna gain. The operations of 1420 may be performed according to the methods described herein. In certain examples, aspects of the operations of 1420 may be performed by a A-MPR component as described with reference to FIGS. 4 through 7.

At 1425 the UE 115 may transmit data using a maximum output power that is adjusted in accordance with the A-MPR. The operations of 1425 may be performed according to the methods described herein. In certain examples, aspects of the operations of 1425 may be performed by an output power component as described with reference to FIGS. 4 through 7.

Figure 15:
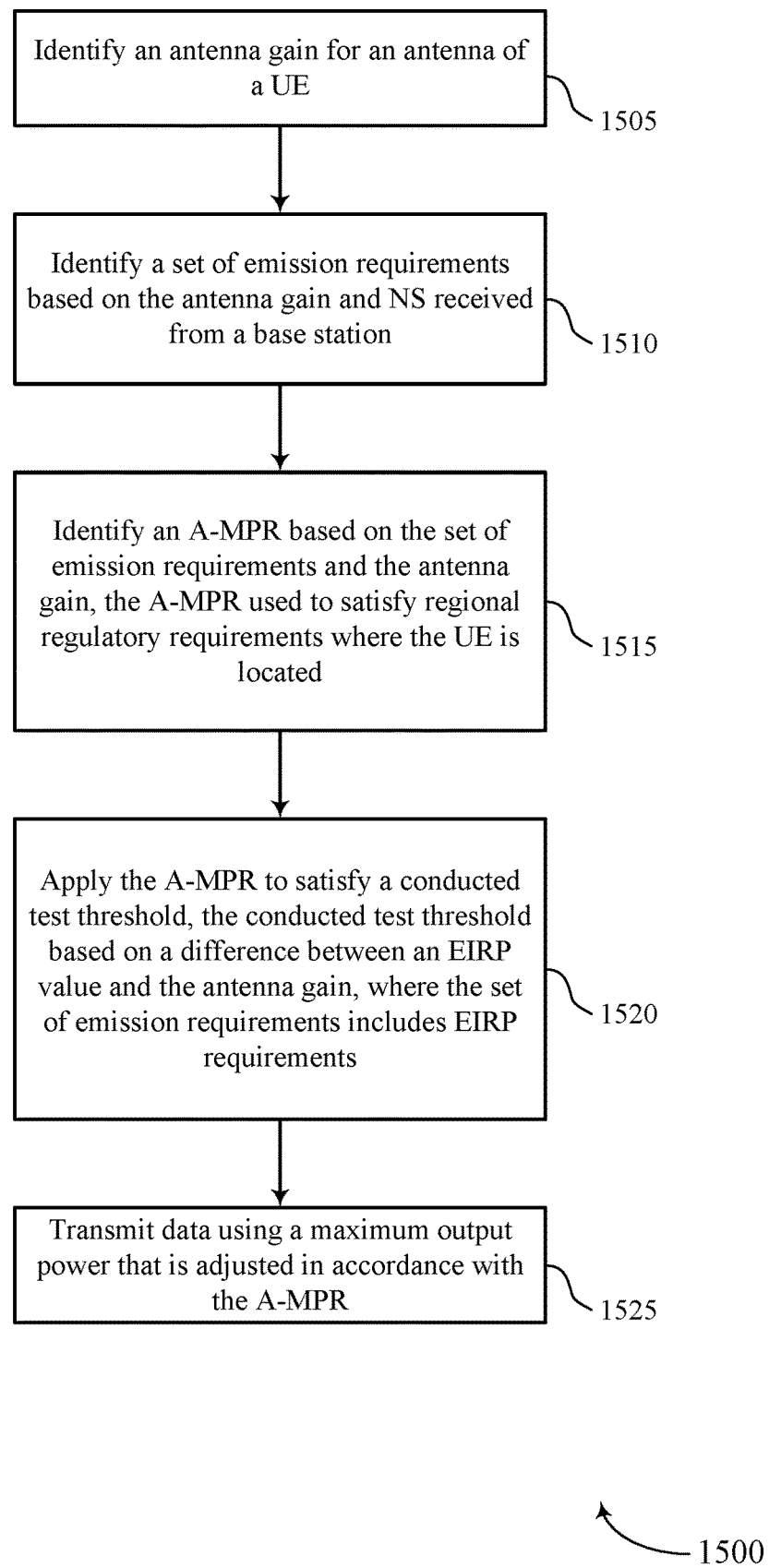

FIG. 15 shows a flowchart illustrating a method 1500 for compliance with regional regulatory requirements for UEs 115 with positive antenna gain in accordance with aspects of the present disclosure. The operations of method 1500 may be implemented by a UE 115 or its components as described herein. For example, the operations of method 1500 may be performed by a UE communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may identify an antenna gain for an antenna of the UE 115. The operations of 1505 may be performed according to the methods described herein. In certain examples, aspects of the operations of 1505 may be performed by an antenna gain manager as described with reference to FIGS. 4 through 7.

At 1510 the UE 115 may identify a set of emission requirements based at least in part on the antenna gain and NS received from a base station 105. The operations of 1510 may be performed according to the methods described herein. In certain examples, aspects of the operations of 1510 may be performed by an emission requirement manager as described with reference to FIGS. 4 through 7.

At 1515 the UE 115 may identify an A-MPR based at least in part on the set of emission requirements and the antenna gain, the A-MPR used to satisfy regional regulatory requirements where the UE 115 is located. The operations of 1515 may be performed according to the methods described herein. In certain examples, aspects of the operations of 1515 may be performed by a A-MPR component as described with reference to FIGS. 4 through 7.

At 1520 the UE 115 may apply the A-MPR to satisfy a conducted test threshold, the conducted test threshold based on a difference between an EIRP value and the antenna gain, wherein the set of emission requirements comprises EIRP requirements. The operations of 1520 may be performed according to the methods described herein. In certain examples, aspects of the operations of 1520 may be performed by an output power component as described with reference to FIGS. 4 through 7.

At 1525 the UE 115 may transmit data using a maximum output power that is adjusted in accordance with the A-MPR. The operations of 1525 may be performed according to the methods described herein. In certain examples, aspects of the operations of 1525 may be performed by an output power component as described with reference to FIGS. 4 through 7.

Figure 16:
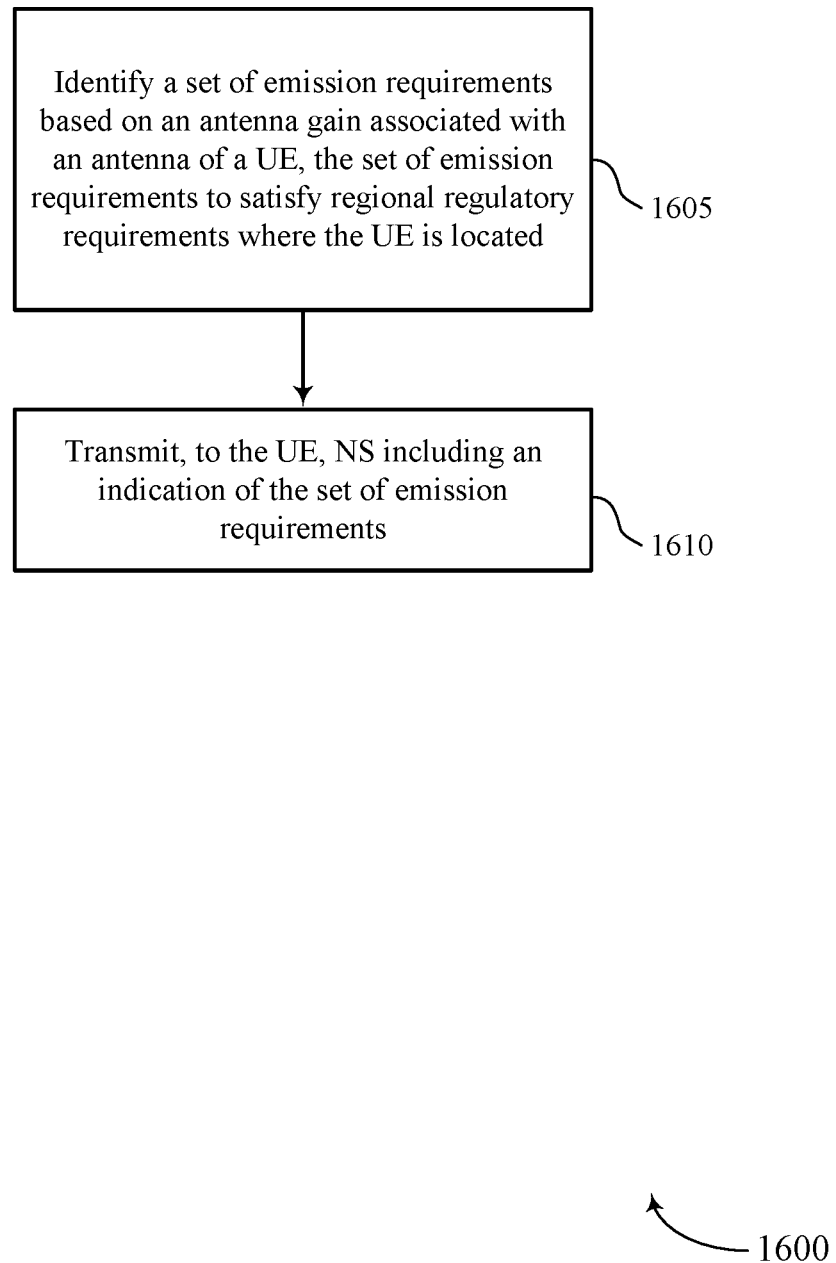

FIG. 16 shows a flowchart illustrating a method 1600 for compliance with regional regulatory requirements for UEs 115 with positive antenna gain in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At 1605 the base station 105 may identify a set of emission requirements based at least in part on an antenna gain associated with an antenna of a UE 115, the set of emission requirements to satisfy regional regulatory requirements where the UE 115 is located. The operations of 1605 may be performed according to the methods described herein. In certain examples, aspects of the operations of 1605 may be performed by a regional requirement manager as described with reference to FIGS. 8 through 11.

At 1610 the base station 105 may transmit, to the UE 115, NS comprising an indication of the set of emission requirements. The operations of 1610 may be performed according to the methods described herein. In certain examples, aspects of the operations of 1610 may be performed by a network signaling manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying an antenna gain for an antenna of the UE;
   identifying a set of emission requirements based at least in part on the antenna gain and network signaling (NS) received from a base station;
   identifying an additional maximum power reduction (A-MPR) based at least in part on the set of emission requirements and the antenna gain, the A-MPR used to satisfy regional regulatory requirements where the UE is located; and
   transmitting data using a maximum output power that is adjusted in accordance with the A-MPR.

2. The method of claim 1, further comprising:
   receiving, from the base station, the NS including an NS value associated with an antenna gain group that includes the antenna gain; and
   identifying the A-MPR based on the antenna gain and the NS value.

3. The method of claim 1, further comprising:
   receiving, from the base station, the NS including an NS value associated with a plurality of antenna gain groups;
   identifying an antenna gain group of the plurality of antenna gain groups, the antenna gain group including the antenna gain; and
   identifying the A-MPR based on the antenna gain group.

4. The method of claim 1, further comprising:
   applying the A-MPR to satisfy a conducted test threshold, the conducted test threshold based on a difference between an equivalent isotropic radiated power (EIRP) value and the antenna gain, wherein the set of emission requirements comprises EIRP requirements.

5. The method of claim 1, wherein the A-MPR is from a set of A-MPR values, different A-MPR values of the set of A-MPR values corresponding to respective antenna gain groups.

6. The method of claim 5, wherein each of the respective antenna gain groups comprise a range of antenna gain values that are non-overlapping between the respective antenna gain groups.

7. The method of claim 1, wherein the antenna gain is greater than or equal to 0 decibels-isotropic (dBi).

8. The method of claim 1, further comprising:
transmitting the data using a vehicle-to-everything (V2X) transmission.

9. The method of claim 1, further comprising:
determining a region that the UE is located in based at least in part on global navigation satellite system (GNSS) positioning signaling; and
identifying the NS based at least in part on the determined region.

10. The method of claim 1, further comprising:
transmitting an indication of the antenna gain to the base station.

11. An apparatus for wireless communication, comprising:
a processor;
memory in electronic communication with the processor; and
instructions stored in the memory and executable by the processor to cause the apparatus to:
identify an antenna gain for an antenna of a user equipment (UE);
identify a set of emission requirements based at least in part on the antenna gain and network signaling (NS) received from a base station;
identify an additional maximum power reduction (A-MPR) based at least in part on the set of emission requirements and the antenna gain, the A-MPR used to satisfy regional regulatory requirements where the UE is located; and
transmit data using a maximum output power that is adjusted in accordance with the A-MPR.

12. The apparatus of claim 11, wherein the instructions are further executable by the processor to cause the apparatus to:
receive, from the base station, the NS including an NS value associated with an antenna gain group that includes the antenna gain; and
identify the A-MPR based on the antenna gain and the NS value.

13. The apparatus of claim 11, wherein the instructions are further executable by the processor to cause the apparatus to:
receive, from the base station, the NS including an NS value associated with a plurality of antenna gain groups;
identify an antenna gain group of the plurality of antenna gain groups, the antenna gain group including the antenna gain; and
identify the A-MPR based on the antenna gain group.

14. The apparatus of claim 11, wherein the instructions are further executable by the processor to cause the apparatus to:
apply the A-MPR to satisfy a conducted test threshold, the conducted test threshold based on a difference between an equivalent isotropic radiated power (EIRP) value and the antenna gain, wherein the set of emission requirements comprises EIRP requirements.

15. The apparatus of claim 11, wherein the A-MPR is from a set of A-MPR values, different A-MPR values of the set of A-MPR values corresponding to respective antenna gain groups.

16. The apparatus of claim 15, wherein each of the respective antenna gain groups comprise a range of antenna gain values that are non-overlapping between the respective antenna gain groups.

17. The apparatus of claim 11, wherein the instructions are further executable by the processor to cause the apparatus to:
determining a region that the UE is located in based at least in part on global navigation satellite system (GNSS) positioning signaling; and
identifying the NS based on the determined region.

18. The apparatus of claim 11, wherein the antenna gain is greater than or equal to 0 decibels-isotropic (dBi).

19. The apparatus of claim 11, wherein the instructions are further executable by the processor to cause the apparatus to:
transmit the data using a vehicle-to-everything (V2X) transmission.

20. An apparatus for wireless communication, comprising:
means for identifying an antenna gain for an antenna of a user equipment (UE);
means for identifying a set of emission requirements based at least in part on the antenna gain and network signaling (NS) received from a base station;
means for identifying an additional maximum power reduction (A-MPR) based at least in part on the set of emission requirements and the antenna gain, the A-MPR used to satisfy regional regulatory requirements where the UE is located; and
means for transmitting data using a maximum output power that is adjusted in accordance with the A-MPR.

21. The apparatus of claim 20, further comprising:
means for receiving, from the base station, the NS including an NS value associated with an antenna gain group that includes the antenna gain; and
means for identifying the A-MPR based on the antenna gain and the NS value.

22. The apparatus of claim 20, further comprising:
means for receiving, from the base station, the NS including an NS value associated with a plurality of antenna gain groups;
means for identifying an antenna gain group of the plurality of antenna gain groups, the antenna gain group including the antenna gain; and
means for identifying the A-MPR based on the antenna gain group.

23. The apparatus of claim 20, further comprising:
means for applying the A-MPR to satisfy a conducted test threshold, the conducted test threshold based on a difference between an equivalent isotropic radiated power (EIRP) value and the antenna gain, wherein the set of emission requirements comprises EIRP requirements.

24. The apparatus of claim 20, wherein the A-MPR is from a set of A-MPR values, different A-MPR values of the set of A-MPR values corresponding to respective antenna gain groups.

25. The apparatus of claim 20, wherein each of the respective antenna gain groups comprise a range of antenna gain values that are non-overlapping between the respective antenna gain groups.

26. The apparatus of claim 20, wherein the antenna gain is greater than 0 decibels-isotropic (dBi).

27. A non-transitory computer-readable medium storing code for wireless communication, the code comprising instructions executable by a processor to:
identify an antenna gain for an antenna of a user equipment (UE);
identify a set of emission requirements based at least in part on the antenna gain and network signaling (NS) received from a base station;
identify an additional maximum power reduction (A-MPR) based at least in part on the set of emission requirements and the antenna gain, the A-MPR used to satisfy regional regulatory requirements where the UE is located; and transmit data using a maximum output power that is adjusted in accordance with the A-MPR.

28. The non-transitory computer-readable medium of claim 27, wherein the instructions are further executable by the processor to:

receive, from the base station, the NS including an NS value associated with an antenna gain group that includes the antenna gain; and identify the A-MPR based on the antenna gain and the NS value.

29. The non-transitory computer-readable medium of claim 27, wherein the instructions are further executable by the processor to:

receive, from the base station, the NS including an NS value associated with a plurality of antenna gain groups;

identify an antenna gain group of the plurality of antenna gain groups, the antenna gain group including the antenna gain; and identify the A-MPR based on the antenna gain group.

30. The non-transitory computer-readable medium of claim 27, wherein the instructions are further executable by the processor to:

apply the A-MPR to satisfy a conducted test threshold, the conducted test threshold based on a difference between an equivalent isotropic radiated power (EIRP) value and the antenna gain, wherein the set of emission requirements comprises EIRP requirements.

* * * * *